(12) United States Patent
Collado Umana et al.

(10) Patent No.: US 12,500,916 B1
(45) Date of Patent: Dec. 16, 2025

(54) DISTRIBUTED ADVERSARIAL ATTACK DETECTION

(71) Applicant: HiddenLayer, Inc., Austin, TX (US)

(72) Inventors: Julian Collado Umana, Irvine, CA (US); Andrew Davis, Portland, OR (US)

(73) Assignee: HiddenLayer, Inc., Austin, TX (US)

( * ) Notice: Subject to any disclaimer, the term of this patent is extended or adjusted under 35 U.S.C. 154(b) by 0 days.

(21) Appl. No.: 19/270,295

(22) Filed: Jul. 15, 2025

(51) Int. Cl.
*H04L 9/40* (2022.01)
*H04L 41/16* (2022.01)

(52) U.S. Cl.
CPC .......... *H04L 63/1425* (2013.01); *H04L 41/16* (2013.01)

(58) Field of Classification Search
CPC .... H04L 63/1425; H04L 41/16; G06F 21/554
See application file for complete search history.

(56) References Cited

U.S. PATENT DOCUMENTS

| | | | |
|---|---|---|---|
| 9,654,485 B1* | 5/2017 | Neumann | H04L 63/1416 |
| 2021/0319784 A1* | 10/2021 | Le Roux | H04L 63/1441 |
| 2022/0086179 A1* | 3/2022 | Levin | H04W 12/63 |
| 2022/0116420 A1* | 4/2022 | Weber | G06F 21/554 |
| 2022/0201008 A1* | 6/2022 | Stergioudis | G06N 20/00 |
| 2023/0252140 A1* | 8/2023 | Coulter | G06N 20/00 726/23 |
| 2024/0013220 A1* | 1/2024 | Martins | G06Q 30/018 |
| 2024/0289449 A1* | 8/2024 | Xu | G06F 21/554 |
| 2024/0430273 A1* | 12/2024 | Millar | H04L 63/1416 |
| 2025/0165617 A1* | 5/2025 | Cameron | G06F 21/552 |
| 2025/0245344 A1* | 7/2025 | Singla | G06F 21/554 |

OTHER PUBLICATIONS

Ivan Fursov et al., Adversarial attacks on deep models for financial transaction records, ACM (Year: 2021).*

* cited by examiner

*Primary Examiner* — Shanto Abedin
(74) *Attorney, Agent, or Firm* — Jones Day

(57) ABSTRACT

A query to be input into a machine learning model which is associated with a first user is received. A first embedding is generated based on the query. A plurality of historical queries of the machine learning model having a corresponding embedding meeting first criteria relative to the first embedding is then determined using a first distance-based similarity analysis technique. In addition, a plurality of other users of the machine learning model each having a corresponding user embedding meeting second criteria relative to a user embedding for the first user are determined using a second distance-based similarity analysis technique. Data indicating a potential attack on the machine learning model is provided to a consuming application or process based on the query neighbor determination and the user neighbor determination.

30 Claims, 25 Drawing Sheets

Sample Embedding

Model M using the original space representation x_1 as input

Different users submit iterated versions of the attack

Four nearest neighbors of e_4 with distances

Distance between four nearest neighbors of e_4 with respect to each other

User space KNN

Simplified graph representation

DISTRIBUTED ADVERSARIAL ATTACK DETECTION

TECHNICAL FIELD

The subject matter described herein relates to techniques for detecting distributed adversarial attacks on machine learning models to prevent such machine learning models from operating in an undesired manner.

BACKGROUND

Machine learning (ML) models are increasingly being subjected to distributed adversarial attacks in which a plurality of users, in a coordinated fashion, query a machine learning model to cause it to behave in an undesired manner. In some cases, the distributed adversarial attacks can be used to cause the model to misclassify or provide wrong values as outputs. In other cases, the distributed adversarial attacks can be used to have the machine learning model provide information to replicate the model thus allowing a malicious actor to effectively steal the model.

SUMMARY

In a first aspect, a query to be input into a machine learning model which is associated with a first user is received. A first embedding is generated based on the query. A plurality of historical queries of the machine learning model having a corresponding embedding meeting first criteria (e.g., within a specified distance, within n nearest neighbors, within a centroid, etc.) relative to the first embedding is then determined using a first distance-based similarity analysis technique. In addition, a plurality of other users of the machine learning model each having a corresponding user embedding meeting second criteria (e.g., within a specified distance, within n nearest neighbors, etc.) relative to a user embedding for the first user are determined using a second distance-based similarity analysis technique. Data indicating a potential attack on the machine learning model is provided to a consuming application or process based on the query neighbor determination and the user neighbor determination.

The first distance-based similarity analysis technique can be the same as the second distance-based similarity analysis technique. In other variations, the similar analysis techniques are different.

The first criteria can be a first distance threshold and the second criteria can be a second distance threshold. In some variations, the thresholds are different while in other variations the distances are the same. The distances thresholds can be variable or static (i.e., a pre-defined value, etc.).

A first portion of the historical queries can originate from the first user and a second portion of the historical queries can originate from users different than the first user. In some variations, the first portion of the historical queries are weighted differently than the second portion of the historical queries (when determining a likelihood of an adversarial attack, etc.).

The distance-based similarity analyses can take different forms including one or more of: k-nearest neighbors, a Euclidean distance, a Minkowski distance, a cosine distance, a Hamming Distance and/or a Levenshtein distance.

The determination of other users of the machine learning model having a user embedding meeting second criteria relative to the user embedding for the first user can include calculating a mean distance of the output to the known outputs corresponding to the historical queries, and comparing the mean distance to the second distance threshold.

At least some of the historical queries can be derived from a cluster of neighboring historical queries (i.e., similar historical queries can be combined, etc.).

At least one of the first distance-based similarity analysis and the second distance-based similarity analysis can consider distances between neighbors.

In some variations, an output of the machine learning model responsive to the first query is received. A second embedding is generated based on the output. A plurality of other outputs of the machine learning model each having a corresponding output embedding meeting third criteria relative to the second embedding can be determined using a third distance-based similarity analysis. With such an implementation, the data provided indicating a potential attack on the machine learning model to a consuming application or process is further based on this determination.

The user embedding for the first user can be generated based on a combination of historical queries associated with the first user and identifiable information for the first user. The identifiable information can take different forms including, account information and/or Internet Protocol (IP) address for the first user.

The consuming application or process can initiate one or more remediation actions to prevent or lessen an impact of the adversarial attack.

In an interrelated aspect, a first query associated with a first user to be input into a machine learning model and a first output generated by the machine learning model responsive to the first query is received. A first embedding is generated based on the combination of the first query and the first output. It is then determined, using a first distance-based similarity analysis technique, a plurality of historical pairs of queries and outputs of the machine learning model having a corresponding embedding meeting first criteria relative to the first embedding. It is also determined, using a second distance-based similarity analysis technique, a plurality of other users of the machine learning model each having a corresponding user embedding meeting second criteria relative to a user embedding for the first user. Data indicating a likelihood of an attack on the machine learning model is provided to a consuming application or process based on the first determining and the second determining.

The subject matter described herein provides many technical advantages. For example, the current subject matter can be used to identify and remediate adversarial attacks on machine learning models and/or machine learning model architectures. The adversarial attacks addressed by the current subject matter can include evasion attacks originating from multiple users in which the objective is to make a machine learning model misclassify or predict the wrong value for a sample (i.e., an input such as a prompt, etc.) by adding minor modifications to it over time. Adversarial attacks addressed by the current subject matter also encompass model stealing attacks originating from multiple users in which the objective is to steal or replicate a model by sending a larger number samples in order to replicate or mimic the behavior of the machine learning model being attacked.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to techniques for detecting a distributed adversarial attack on a machine learning model and/or a machine learning model architecture. The adversarial attacks are distributed in that multiple user accounts are used as opposed to samples solely originating from a single user. These adversarial attacks can, for example, originate through a public facing application programming interface (API) in which users can submit samples to a model and obtain some output from the AI models. The submission history (e.g., sample log, output log, etc.) for particular users (which can be unique or otherwise have an identifier associated therewith) can be stored (e.g., in a computing environment executing the AI models and/or in a computing environment external to the AI model environment which monitors inputs and/or outputs of the AI model) or otherwise made available for the techniques provided herein.

The current subject matter leverages the fact that a distributed adversarial attack can often happen using accounts that are very similar. Each one of these accounts can submit a slightly different version of the attack sample and possibly benign samples as well. So given a new sample, the current subject matter is used to check if there are similar but not exact samples that have been submitted by other users which indicates that these are potentially adversarial probes. The users that submitted the potentially adversarial probes are checked. If the users that submitted the potential attack probes are similar in nature (which is suggestive of fake accounts), the AI model is likely under a distributed adversarial attack.

Figure 1:
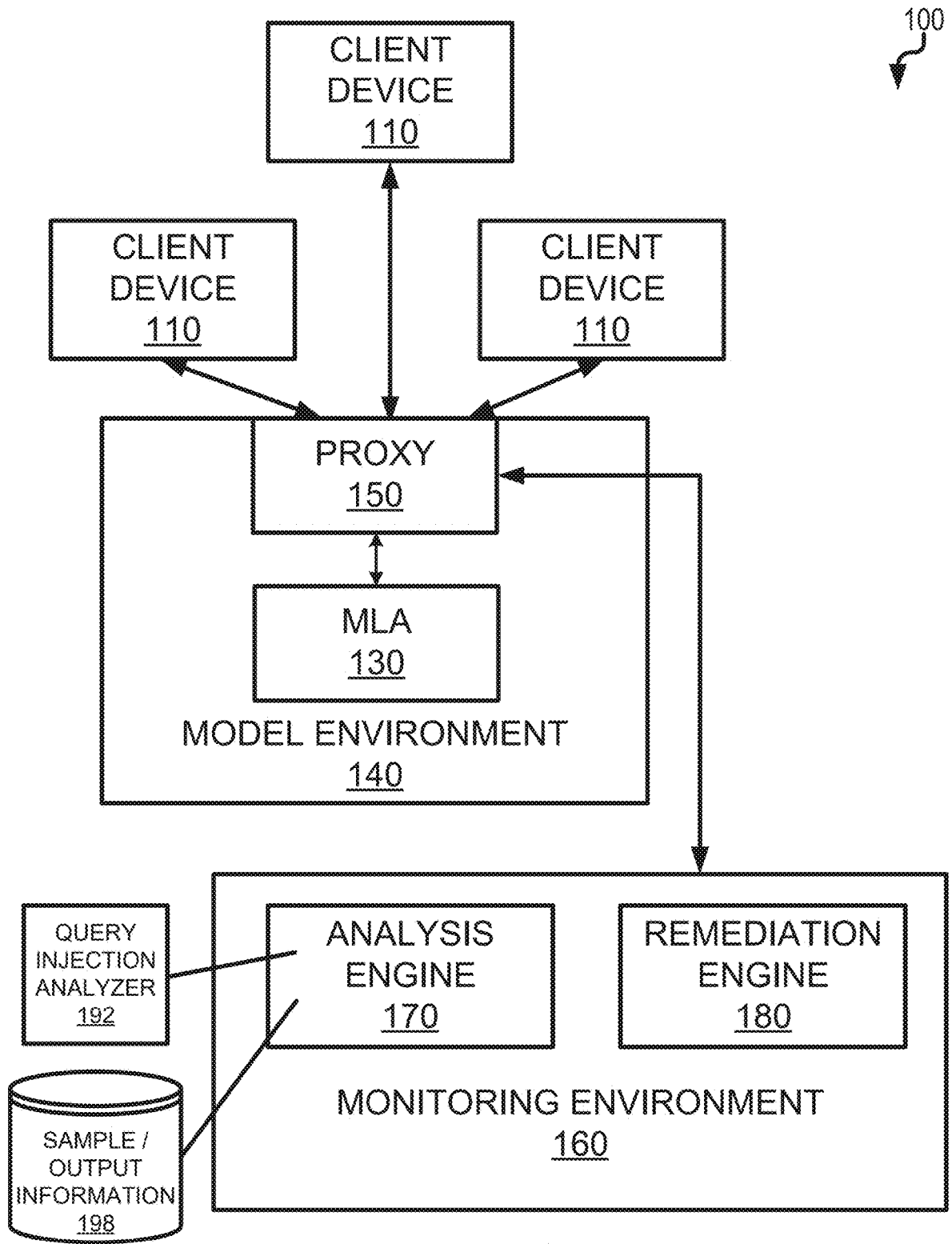
FIG. 1 is a system diagram illustrating a security platform for machine learning model architectures having a monitoring environment including an analysis engine and remediation engine.

FIG. 1 is a diagram 100 in which each of a plurality of client devices 110 (e.g., an endpoint computing device, a server, etc.) can query, over one or more networks, a machine learning model architecture (MLA) 130 forming part of a model environment 140. It will be appreciated that querying the MLA 130 can refer to querying one or more machine learning models which form part of the MLA 130. These queries can include or otherwise characterize various information including prompts ((e.g., alphanumeric strings), videos, audio, images or other files. The model environment 140 can include one or more servers and data stores to execute the MLA 130 and process and respond to queries from the client devices 110. The MLA 130 can comprise or otherwise execute one or more AI models utilizing one or more of natural language processing, computer vision, and machine learning. Intermediate the MLA 130 and the client devices 110 is a proxy 150 which can analyze, intercept and/or modify inputs and/or outputs of the MLA 130.

The proxy 150 can communicate, over one or more networks, with a monitoring environment 160. The monitoring environment 160 can include one or more servers and data stores to execute an analysis engine 170. The analysis engine 170 can execute one or more of the algorithms/models described below with regard to the protection of the MLA 130. The analysis engine 170 can execute a query injection analyzer 192 which can comprise or otherwise execute algorithms, detection logic, and/or machine learning models which can be used to characterize queries received by the MLA 130. Characterize can include, for example, identifying whether the query seeks to cause the MLA 130 to behave in an undesired manner including, for example, leaking private or otherwise sensitive information. The analysis engine 152 and/or the query injection analyzer 192 (directly or indirectly) can access a data store 198 which, in some variations, comprises information about users including account information, samples, probes, outputs of the MLA 130 and the like.

The proxy 150 can, in some variations, relay received queries to the monitoring environment 160 prior to ingestion by the MLA 130. The proxy 150 can also or alternatively relay information which characterizes the received queries (e.g., excerpts, extracted features, metadata, etc.) to the monitoring environment 160 prior to ingestion by the MLA 130.

Figure 2:
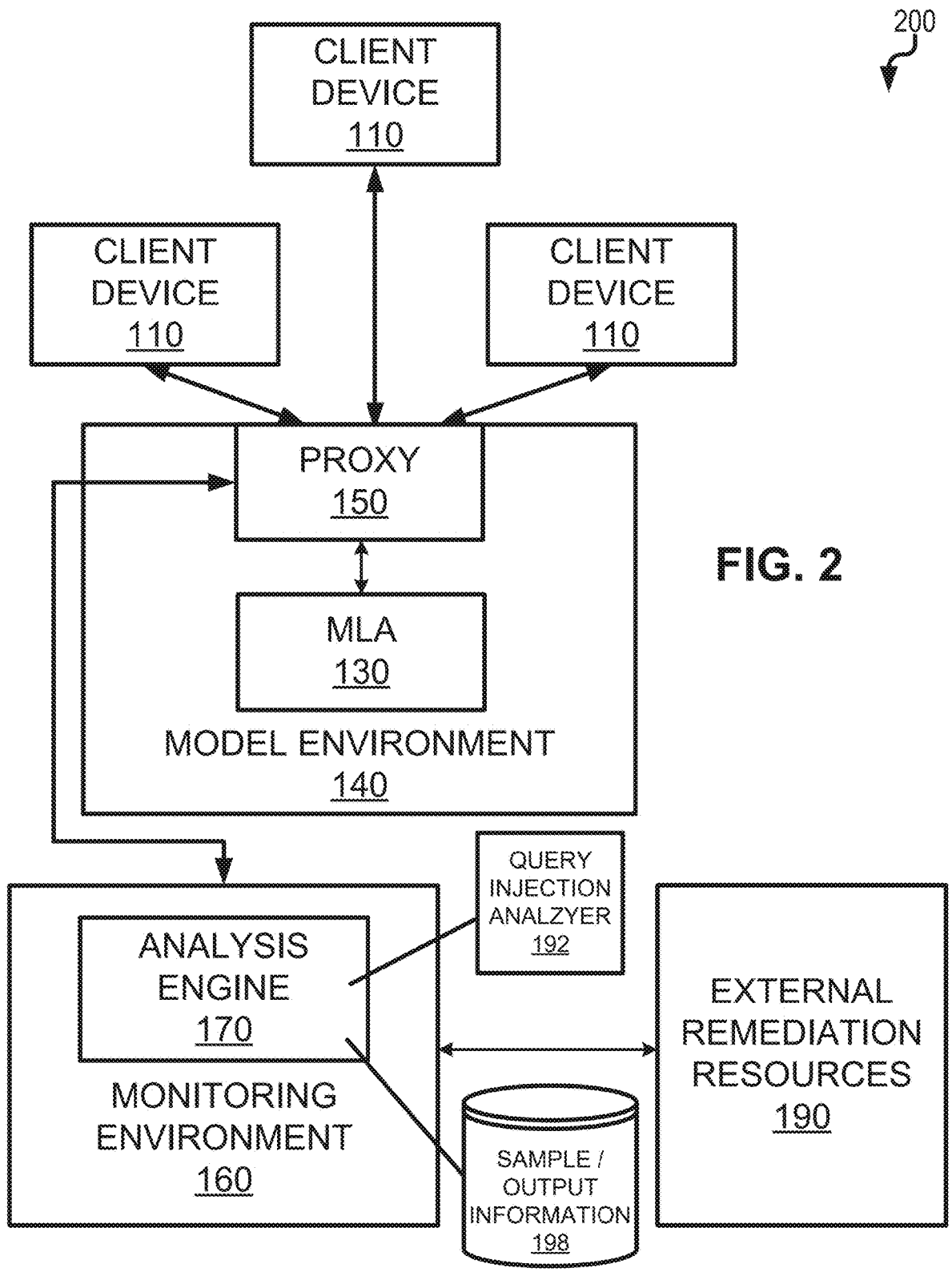
FIG. 2 is a system diagram illustrating a security platform for machine learning model architectures having a monitoring environment including an analysis engine which interfaces with external remediation resources.

The analysis engine 170 can analyze the relayed queries and/or information in order to make an assessment or other determination as to whether the queries are indicative of being malicious. In some cases, a remediation engine 180 which can form part of the monitoring environment 160 (or be external such as illustrated in FIG. 2) can take one or more remediation actions in response to a determination of a query as being malicious. These remediation actions can take various forms including transmitting data to the proxy 150 which causes the query to be blocked before ingestion by the MLA 130. In some cases, the remediation engine 180 can cause data to be transmitted to the proxy 150 which causes the query to be modified in order to be non-malicious, to remove sensitive information, and the like. Such queries, after modification, can be ingested by the MLA 130 and the output provided to the requesting client device 110. Alternatively, the output of the MLA 130 (after query modification) can be subject to further analysis by the analysis engine 170.

The proxy 150 can, in some variations, relay outputs of the MLA to the monitoring environment 160 prior to transmission to the respective client device 110. The proxy 150 can also or alternatively relay information which characterizes the outputs (e.g., excerpts, extracted features, metadata, etc.) to the monitoring environment 160 prior to transmission to the respective client device 110.

The analysis engine 170 can analyze the relayed outputs and/or information from the MLA 130 in order to make an assessment or other determination as to whether the queries are indicative of being malicious (based on the output alone or based on combination of the input and the output). In some cases, the remediation engine 180 can, similar to the actions when the query analysis above, take one or more remediation actions in response to a determination of a query as being malicious. These remediation actions can take various forms including transmitting data to the proxy 150 which causes the output of the MLA 130 to be blocked prior to transmission to the requesting client device 110. In some cases, the remediation engine 180 can cause data to be transmitted to the proxy 150 which causes the output for transmission to the requesting client device 110 to be modified in order to be non-malicious, to remove sensitive information, and the like.

FIG. 2 is a diagram 200 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings), videos, audio, images or other files. The model environment 140 can include one or more servers and data stores to execute the MLA 130 and process and respond to queries from the client devices 110. The MLA 130 can comprise or otherwise execute one or more AI models utilizing one or more of natural language processing, computer vision, and machine learning. Intermediate the MLA 130 and the client devices 110 is a proxy 150 which can analyze, intercept and/or modify inputs and/or outputs of the MLA 130.

FIG. 2 is a system diagram 200 illustrating a security platform for machine learning model architectures having a configuration in which the monitoring environment 160 includes an analysis engine 170 which interfaces with external remediation resources 190. In this variation, the monitoring environment 160 does not include a remediation engine 180 but rather communicates, via one or more networks, with external remediation resources 190. The external remediation resources 190 can be computing devices or processes which result in actions such as blocking future requests at the network or user level and/or initiating a remediation action which closes off the impacted system until the malicious action which was output is considered ineffective.

Figure 3:
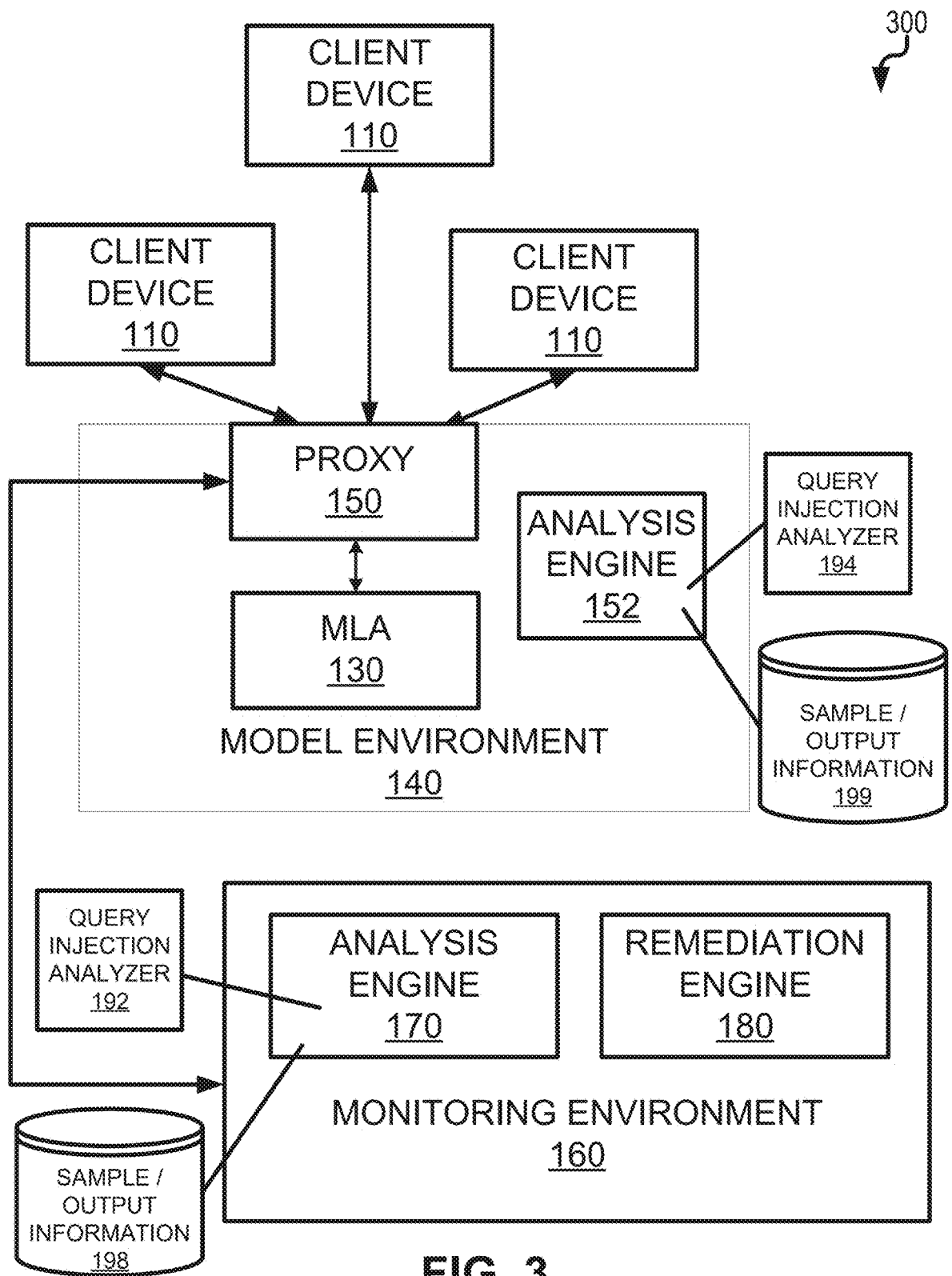
FIG. 3 is a system diagram illustrating a security platform for machine learning model architectures having a model environment having a local analysis engine and a monitoring environment including an analysis engine and a remediation engine.

FIG. 3 is a system diagram 300 illustrating a security platform for machine learning model architectures having a configuration in which the model environment 140 includes a local analysis engine 152 and the monitoring environment 160 includes both an analysis engine 170 and a remediation engine 180. In some cases, one or more of the analysis engine 152 and the remediation engine 180 can be encapsulated or otherwise within the proxy 150. In this arrangement, the local analysis engine 152 can analyze inputs and/or outputs of the MLA 130 in order to determine, for example, whether to pass on such inputs and/or outputs to the monitoring environment 160 for further analysis. For example, the local analysis engine 152 can provide a more computationally efficient local screening of inputs and/or outputs using various techniques as provided herein and optionally, using more lightweight models. If the analysis engine 152 determines that an input or output of the MLA requires further analysis, the input or output (or features characterizing same) are passed to the monitoring environment 160 which can, for example, execute more computationally expensive models (e.g., an ensemble of models, etc.) using the analysis engine 170. The analysis engine 152 can execute a query injection analyzer 194 which can comprise or otherwise execute algorithms, detection logic, and/or machine learning models which can be used to characterize queries received by the MLA 130. Characterize can include, for example, identifying whether the query seeks to cause the MLA 130 to behave in an undesired manner including, for example, leaking private or otherwise sensitive information. The algorithms, detection logic and/or machine learning models forming part of the query injection analyzer 194 can, in some variations, be the same as those in the query injection analyzer 192. In other variations, the query injection analyzer 194 comprises or executes different algorithms, detection logic, and/or machine learning models than the query injection analyzer 192. The analysis engine 152 and/or the query injection analyzer 194 (either directly or indirectly) can access a data store 199 which, in some variations, user information (e.g., account logs for samples and outputs of the MLA 130 and the like, etc.)

Figure 4:
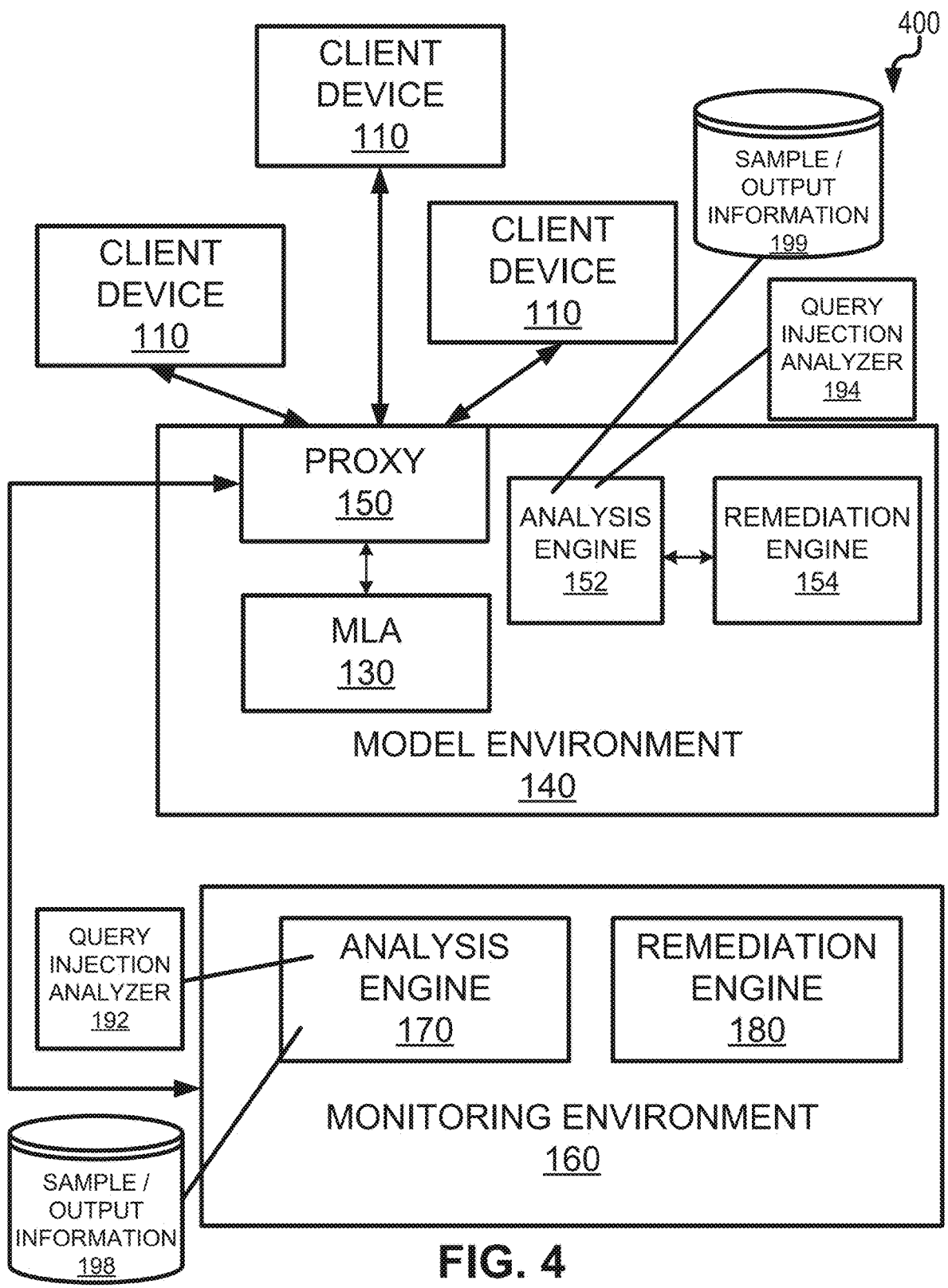
FIG. 4 is a system diagram illustrating a security platform for machine learning model architectures having a model environment having a local analysis engine and a local remediation engine and a monitoring environment including an analysis engine and a remediation engine.

FIG. 4 is a system diagram 400 illustrating a security platform for machine learning model architectures having a configuration in which the model environment includes both a local analysis engine 152 and a local remediation engine 154. The monitoring environment 160, in this variation, can include an analysis engine 170 and a remediation engine 180. In this arrangement, the local analysis engine 152 can analyze inputs and/or outputs of the MLA 130 in order to determine, for example, whether to pass on such inputs and/or outputs to local remediation engine 154 to take an affirmative remedial action such as blocking or modifying such inputs or outputs. In some cases, the local analysis engine 152 can make a determination to bypass the local remediation engine 154 and send data characterizing an input or output of the MLA 130 to the monitoring environment 160 for further actions (e.g., analysis and/or remediation, etc.). The local remediation engine 154 can, for example, handle simpler (i.e., less computationally expensive) actions while, in some cases, the remediation engine 180 forming part of the monitoring environment 160 can handle more complex (i.e., more computationally expensive) actions.

Figure 5:
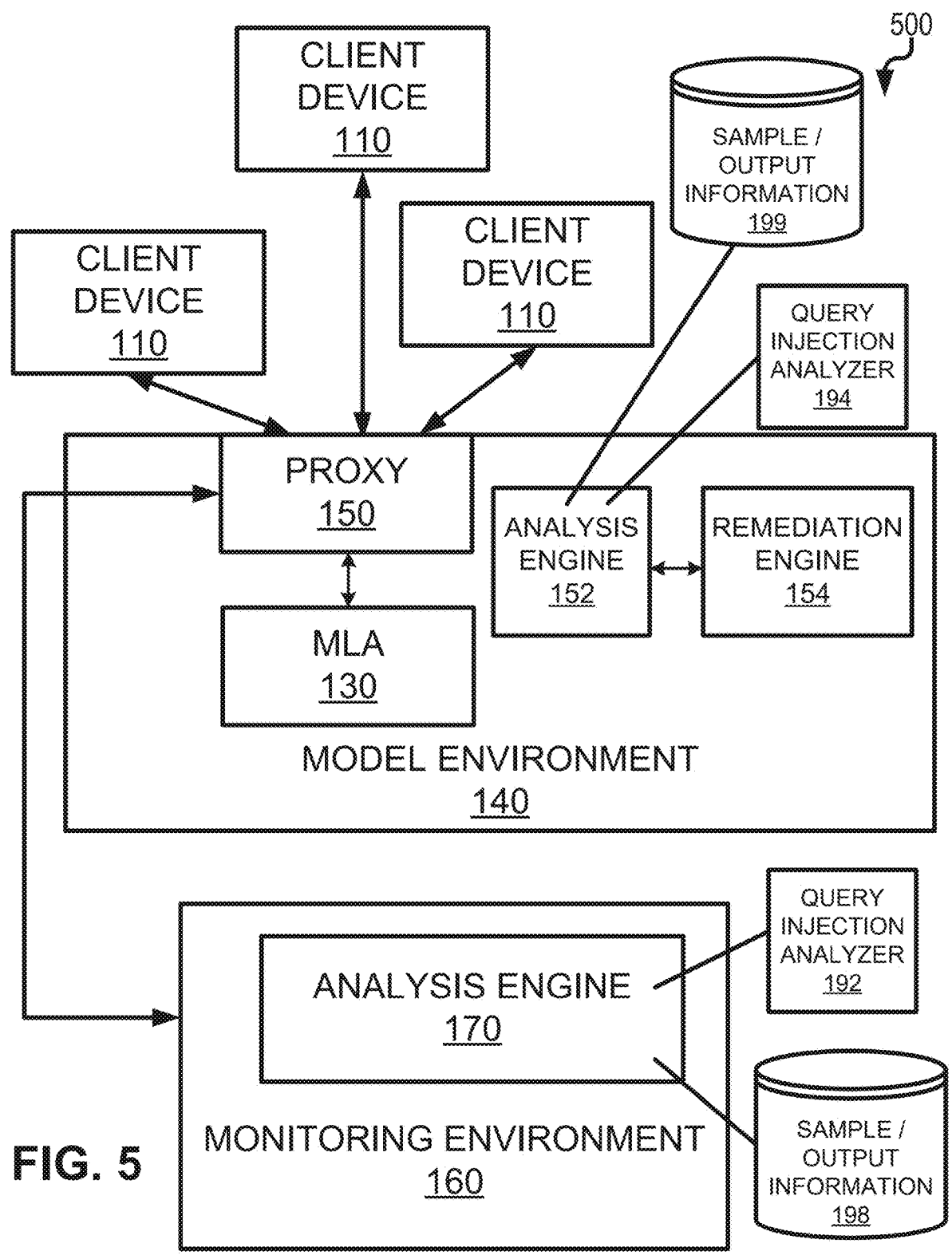
FIG. 5 is a system diagram illustrating a security platform for machine learning model architectures having a model environment having a local analysis engine and a local remediation engine and a monitoring environment including an analysis engine.

FIG. 5 is a system diagram 500 illustrating a security platform for machine learning model architectures in which the model environment 140 includes a local analysis engine 152 and a local remediation engine 154 and the monitoring environment 160 includes an analysis engine 170 (but does not include a remediation engine). With such an arrangement, any remediation activities occur within or are triggered by the local remediation engine 154 in the model environment 140. These activities can be initiated by the local analysis engine 152 and/or the analysis engine 170 forming part of the monitoring environment. In the latter scenario, a determination by the analysis engine 170 results in data (e.g., instructions, scores, etc.) being sent to the model environment 140 which results in remediation actions.

Figure 6:
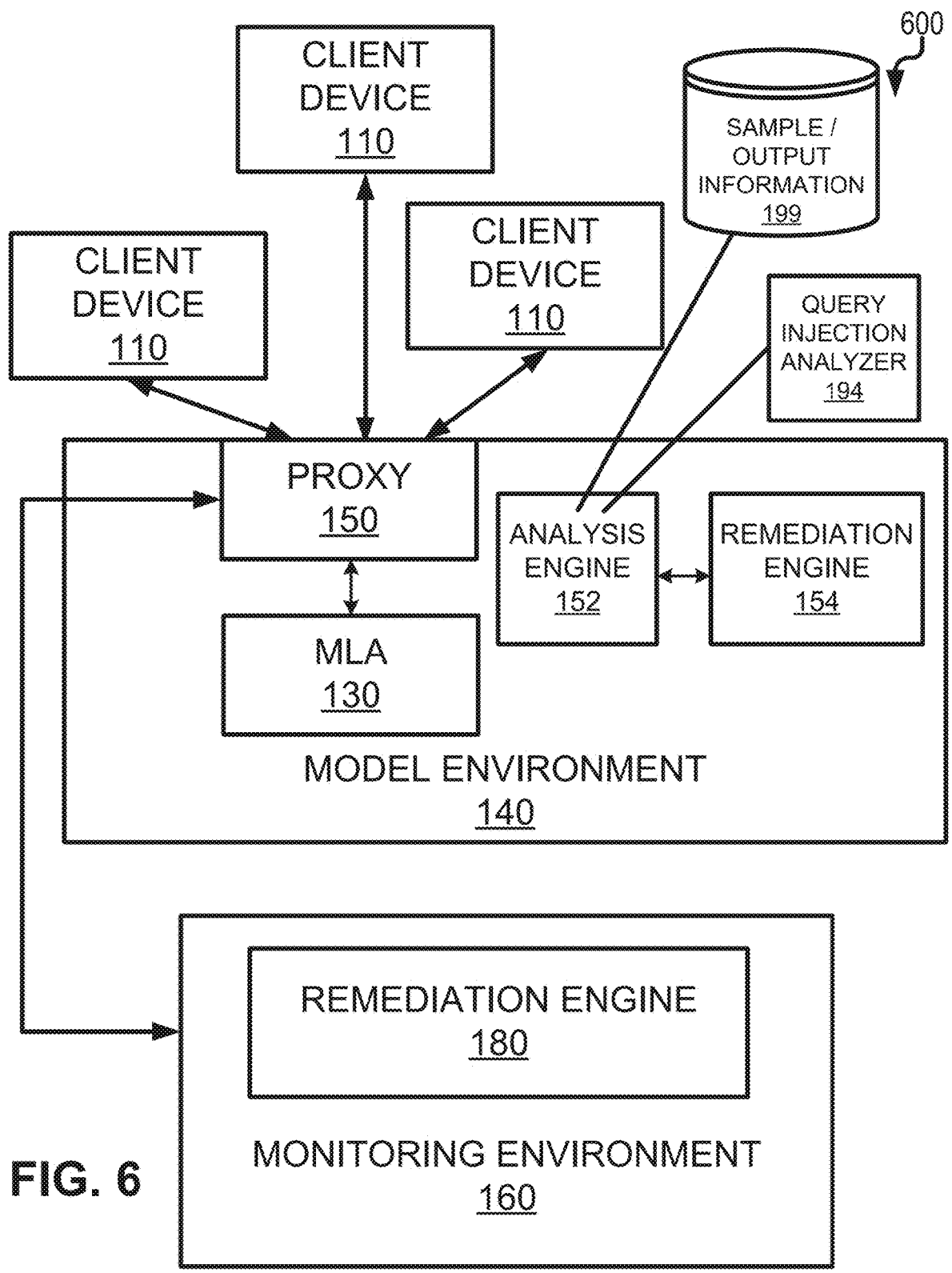
FIG. 6 is a system diagram illustrating a security platform for machine learning model architectures having a model environment having a local analysis engine and a local remediation engine and a monitoring environment including a remediation engine.

FIG. 6 is a system diagram 600 illustrating a security platform 600 for machine learning model architectures in which the model environment 140 includes a local analysis engine 152 and a local remediation engine 154 and the monitoring environment 160 includes a remediation engine 180 (but not an analysis engine). With this arrangement, analysis of inputs or outputs is performed in the model environment by the local analysis engine 152. In some cases, remediation can be initiated or otherwise triggered by the local remediation engine 154 while, in other scenarios, the model environment 140 sends data (e.g., instructions, scores, etc.) to the monitoring environment 160 so that the remediation engine 180 can initiate one or more remedial actions.

Figure 7:
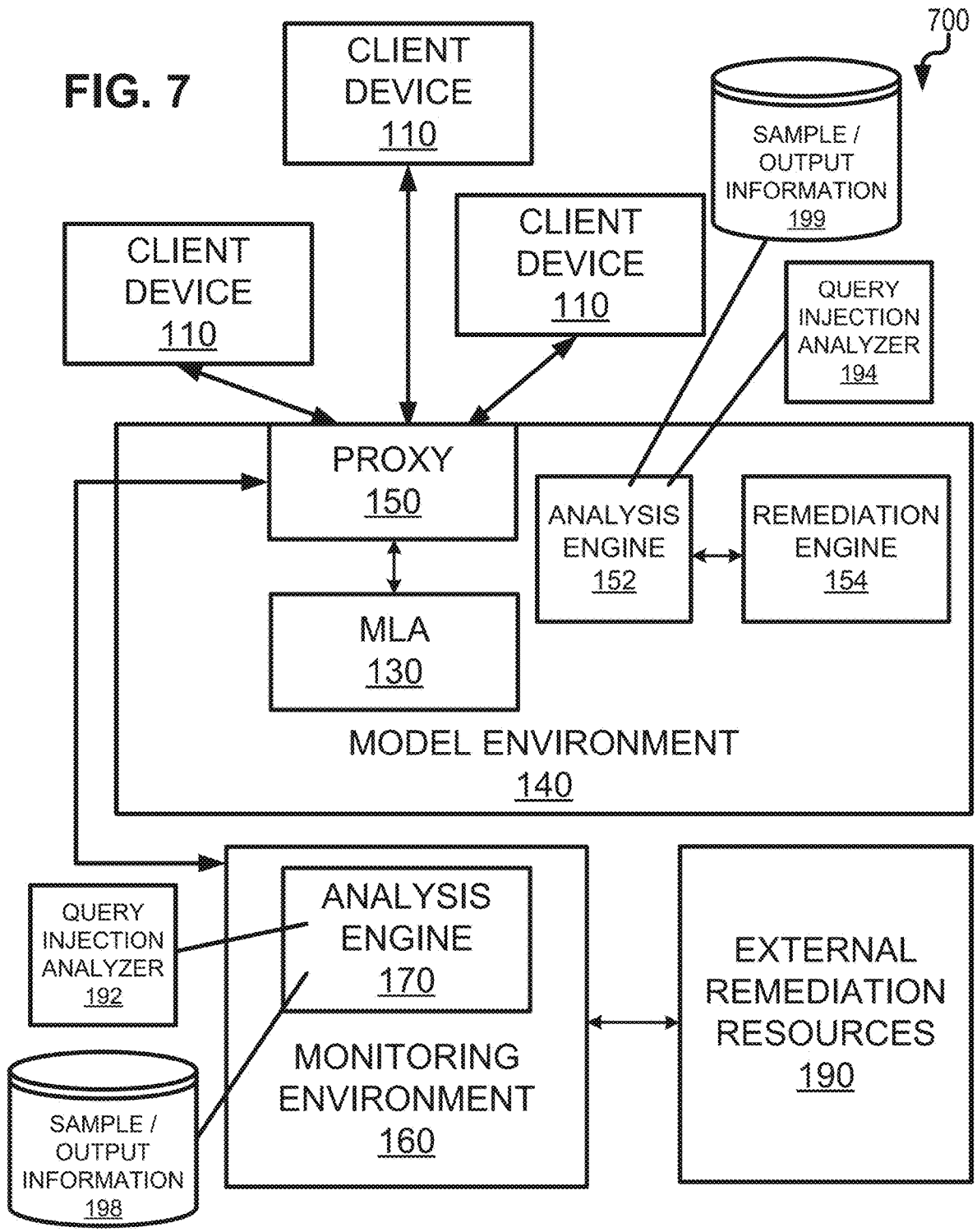
FIG. 7 is a system diagram illustrating a security platform for machine learning model architectures having a model environment having a local analysis engine and a local remediation engine and a monitoring environment including an analysis engine which interfaces with external remediation resources.

FIG. 7 is a system diagram 700 illustrating a security platform for machine learning model architectures in which the model environment 140 has a local analysis engine 152 and a local remediation engine 154 while the monitoring environment 160 includes an analysis engine 170 which interfaces with external remediation resources 190. With this arrangement, remediation can be initiated or otherwise triggered by the local remediation engine 154 and/or the external remediation resources 190. With the latter scenario, the monitoring environment 160 can send data (e.g., instructions, scores, etc.) to the external remediation resources 190 which can initiate or trigger the remediation actions.

Figure 8:
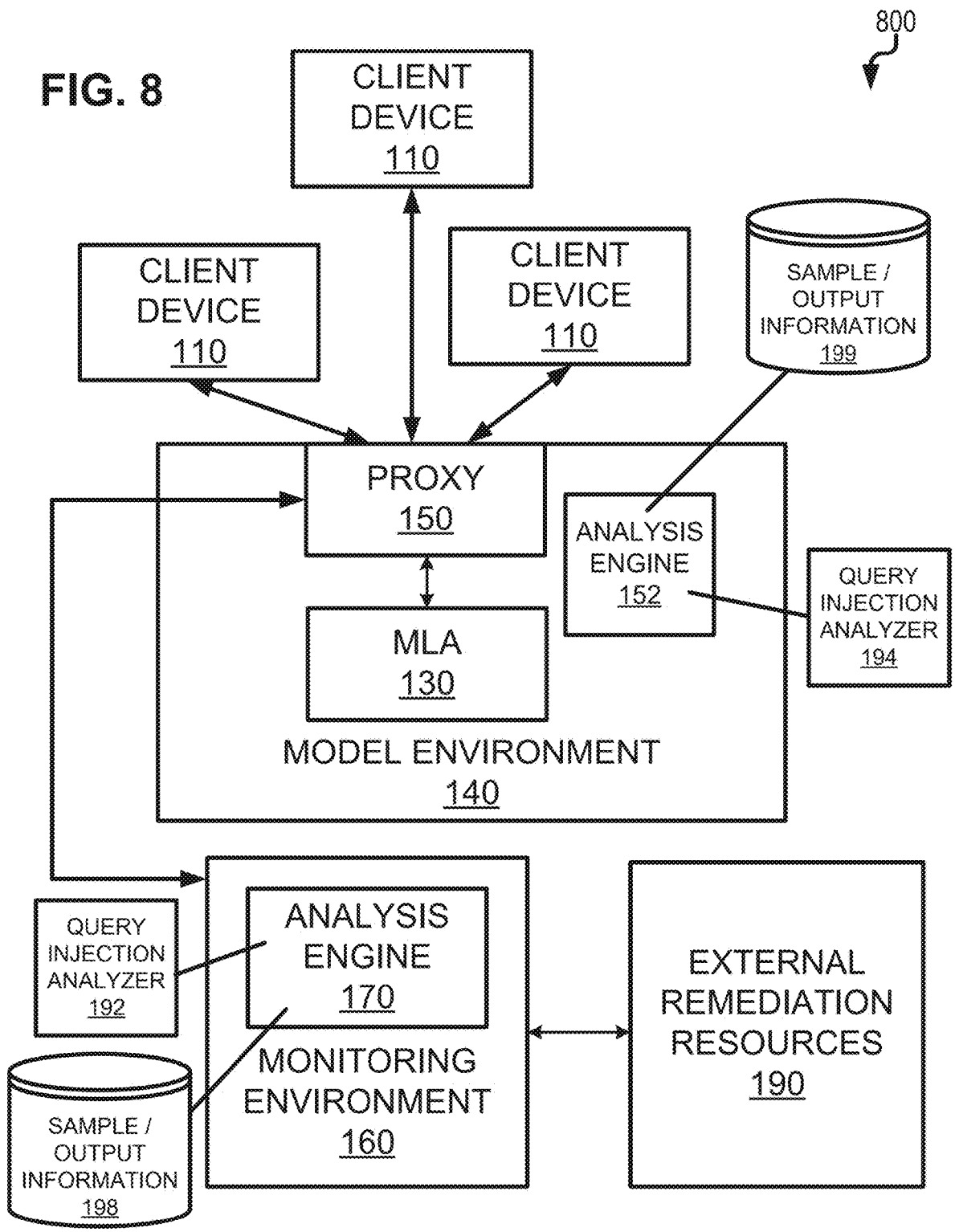
FIG. 8 is a system diagram illustrating a security platform for machine learning model architectures having a model environment having a local analysis engine and a monitoring environment including an analysis engine which interfaces with external remediation resources.

FIG. 8 is a system diagram 800 illustrating a security platform for machine learning model architectures in which the model environment 140 includes a local analysis engine 152 and the monitoring environment 160 includes an analysis engine 170 (but does not include a remediation engine). In this arrangement, analysis can be conducted in the monitoring environment 160 and/or the model environment 140 by the respective analysis engines 152, 170 with remediation actions being triggered or initiated by the external remediation resources 190.

Figure 9:
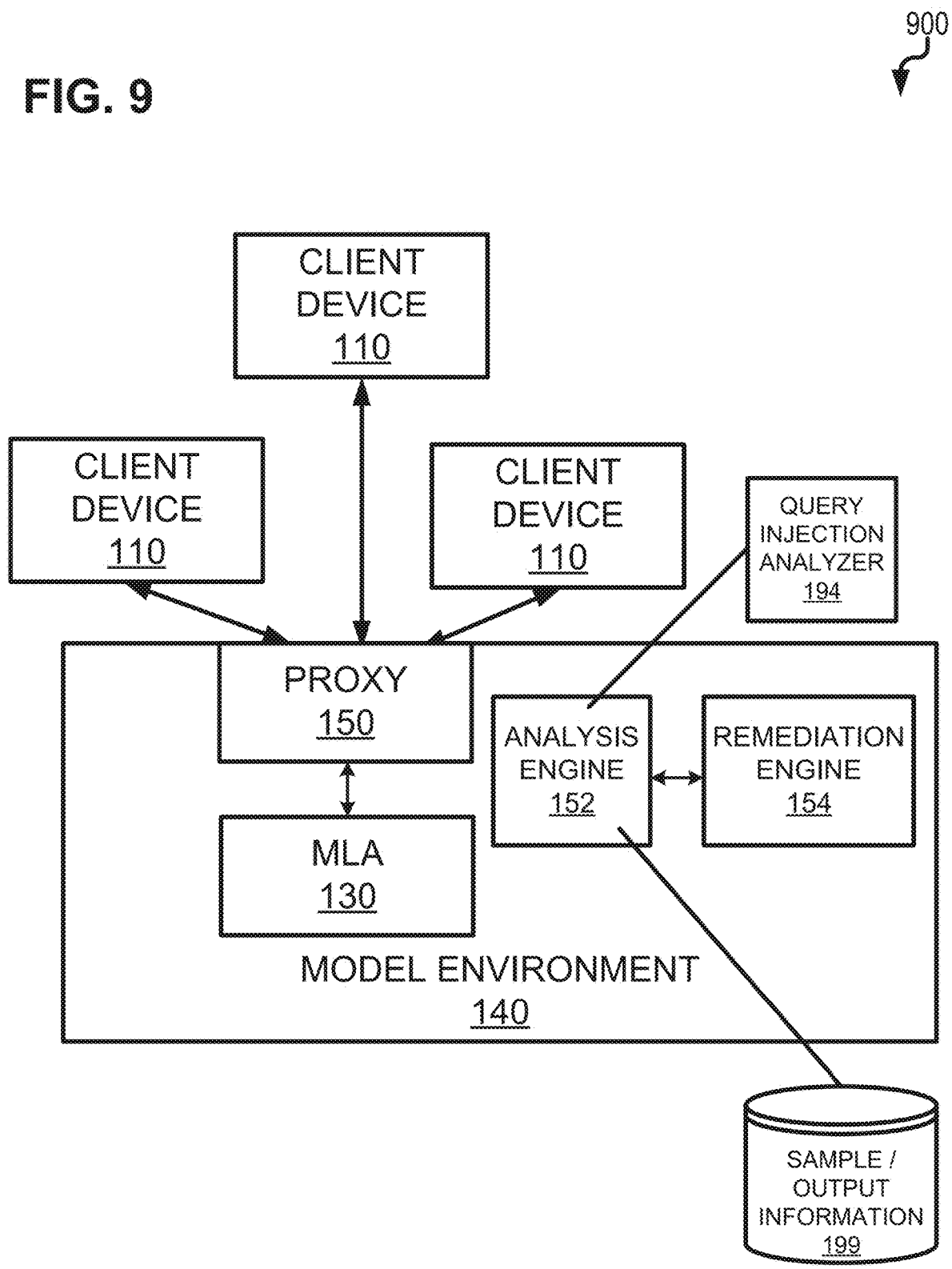
FIG. 9 is a system diagram illustrating a security platform for machine learning model architectures having a model environment having a local analysis engine and remediation engine.

FIG. 9 is a system diagram 900 illustrating a security platform for machine learning model architectures having a model environment 140 has a local analysis engine 152 and a local remediation engine 154. In this arrangement, the analysis and remediation actions are taken wholly within the model environment (as opposed to a cloud-based approach involving the monitoring environment 160 as provided in other variations).

Figure 10:
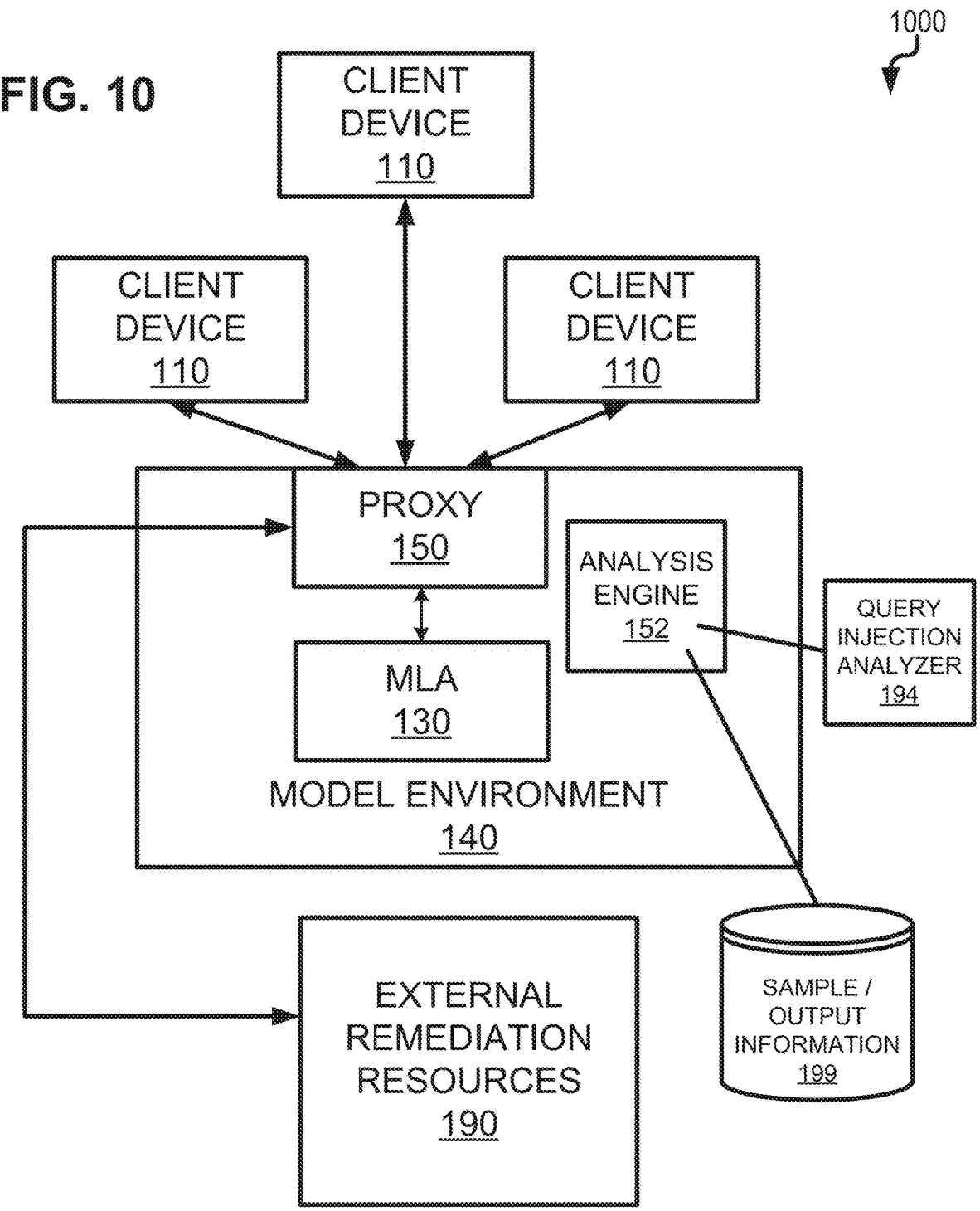
FIG. 10 is a system diagram illustrating a security platform for machine learning model architectures having a model environment having a local analysis engine which interfaces with external remediation resources.

FIG. 10 is a system diagram illustrating a security platform for machine learning model architectures having a model environment 140 including a local analysis engine 152 which interfaces with external remediation resources 190. In this variation, the analysis of queries (e.g., inputs including but not limited to prompts) is conducted local within the model environment 140. Actions requiring remediation are then initiated or otherwise triggered by external remediation resources 190 (which may be outside of the monitoring environment 160) such as those described above.

Figure 11:
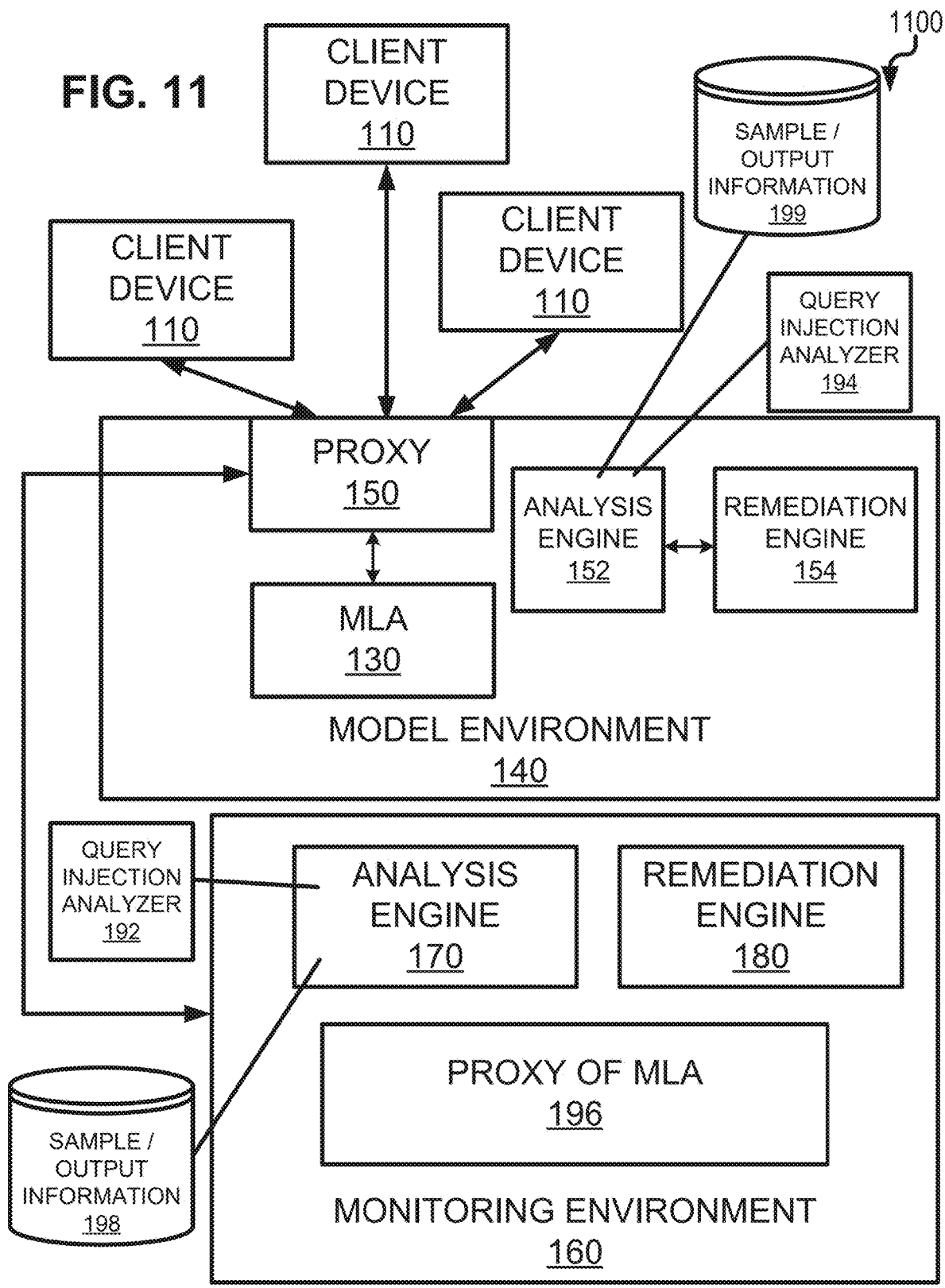
FIG. 11 is a system diagram illustrating a security platform for machine learning model architectures having a model environment which has a proxy of the machine learning architecture.

FIG. 11 is system diagram 11 illustrating a security platform for machine learning model architectures having a configuration in which the model environment includes both a local analysis engine 152 and a local remediation engine 154. The monitoring environment 160, in this variation, can include an analysis engine 170 and a remediation engine 180 as well as a MLA proxy 196 of some or all of the MLA 130. Stated differently, the MLA proxy 196 is a model or series of models that mimic some or all of the behavior of the MLA 130. In this case, the MLA proxy 196 can ingest a query and the output and/or an intermediate result of the MLA proxy 196 can be used by the query injection analyzer 192. Intermediate result can comprise outputs of some or all of layers (prior to the output layer) or other information generated by the MLA 130 before generating a final output. The analysis engine 170 can make a determination of whether to allow the MLA 130 to ingest the query based on an output or intermediate result of the MLA proxy 196.

As indicated above, one or more of the analysis engines 152, 170 can include, execute, or otherwise instantiate a query injection analyzer 192, 194 which, in some variations, comprises a binary classifier which can identify a query as being malicious or benign. In some variations, the query injection analyzer 192, 194 can be a multi-class classifier which can characterize different aspects of a query such as, but not limited to, a level of trustworthiness of the query (e.g. malicious, suspicious, benign, etc.). In some variations, the query injection analyzer 192, 194 can be a multi-class classifier which identifies which of a plurality of different attack types are implicated by an input query.

Two or more of these query injection analyzers 192, 194 can form an ensemble of classifiers (i.e., machine learning models). The ensemble of query injection classifiers can be arranged such that two or more of the classifiers are executing in parallel. In other variations, the ensemble of query injection classifiers can be arranged such that two or more classifiers are working in sequence. For example, a binary classifier can first analyze a query to determine whether the query is malicious or benign. If the query is classified as being malicious, a multi-class classifier can analyze the query to determine a particular type of injection attack. This classification by type can be used to take remediation actions which are specifically tailored to the type of attack. Such an arrangement can also be advantageous when the multi-class classifier is more computationally expensive than the binary classifier (which avoids every query being analyzed by the multi-class classifier). Other arrangements can be provided with a lightweight classified being executed by the analysis engine 152 in the model environment 140 and a more computationally expensive model can be executed by the analysis engine 170 in the monitoring environment 160.

The query injection analyzer 192, 194 can, in some variations, be a machine learning model such as an XGBoost classification model, a logistic regression model, an XLNet model, an Out of Distribution (OOD) model and the like. In the case of a binary classifier, the query injection analyzer 192, 194 can be trained using a corpus of data which can include a plurality of benign queries that do not contain query injection information and a plurality of malicious queries that contain various character strings (which can include portions of alphanumeric symbols, non-printable characters, symbols, controls, etc.) and the like which encapsulate various sorts of query injection. Malicious queries in this context refer to queries that cause the query injection analyzer 192, 194 to exhibit undesired behavior. Benign queries in this context can refer to queries that do not cause the query injection analyzer 192, 194 to exhibit undesired behavior. In some variations, the queries forming part of the corpus can be labeled with their classification. The model training can be performed by converting the queries into text embeddings which can, amongst other features, be used to train the query injection analyzer 192, 194.

The query injection analyzer 192, 194 can in some variations, use a rules engine or a heuristic-based methods to characterize whether a particular query is malicious (i.e., seeks to cause the MLA 130 to behave in an undesired manner, etc.). The query injection analyzer 192, 194 can include different techniques/algorithms in parallel including machine learning-based techniques as well as non-machine learning-based techniques.

In the case of a multi-class classifier, the training corpus for the query injection analyzer 192, 194 can include different sets of queries for each category (i.e., severity level, type of attack, etc.) which are labeled with their category (e.g., security level, type of attack, etc.). The queries can be transformed into text embeddings which can be used, amongst other features, to train the query injection analyzer 192, 194.

The query injection analyzer 192, 194 can be periodically retrained as new query injection techniques are identified and/or new remediation tools are created. Such an arrangement is advantageous in that the query injection analyzer 192, 194 can evolve to address the continually changing threat landscape.

After the query injection analyzer 192, 194 has been trained, the analysis engine 152, 170 can preprocess incoming queries so that they are suitable for ingestion by the query injection analyzer 192, 194. For example, the raw/original query is transformed into text embeddings and then input into the query injection analyzer 192, 194 which then results in a model prediction. The model prediction for a binary classifier can predict the confidence of the query injection classifier. The output of the model can take varying forms including, for example, a score closer to 1 indicating that the query is malicious and a score closer to 0 is indicating that the query is benign. The model prediction for the multi-class classifiers can identify a category for the query (i.e., a class for which the query injection analyzer 192, 194 has been trained)

The multi-class classifier variation of the query injection analyzer 192, 194 can be used to identify a type of attack and, in some cases, take remedial actions which are specifically tailored to that type of attack (e.g., an attempt to obtain sensitive information or otherwise manipulate an output of the MLA 130). Example attacks include for which the query injection analyzer 192, 194 can be trained include, but are not limited to: a direct task deflection attack, a special case attack, a context continuation attack, a context termination attack, a syntactic transformation attack, an encryption attack, a text redirection attack and the like. A direct task deflection attack can include, for example, assigning the MLA 130 a persona unrelated to its original purpose and directing it to do something is not intentionally intended to do. A special case attack can include attempts to obfuscate malicious queries by injecting special case characters randomly or methodically, to confuse the MLA 130 to output a malicious response. A context continuation attack can include providing the MLA 130 with a single query or multiple queries which follow some permutation of a pattern like: benign query, malicious query, benign query, continuation of malicious query and which, in combination, can trigger a malicious output. A context termination attack can include provoking a malicious response from the MLA 130 by providing a context and requesting the MLA 130 to essentially "fill in the blanks". A syntactic transformation attack can include manipulation of the syntax or structure of an input to trigger or otherwise stimulate a malicious response. An encryption attack can include encrypting the query and tasking the MLA 130 to decrypt the query specifying the encryption method. A text redirection attack can include manipulating or redirecting the flow of text-based communications between users or systems. One or more of the model environment remediation engine 154, the monitoring environment remediation engine 180, or the external remediation resources 190 can take or otherwise initiate remediation activities that are specific to the type of attack and/or based on the severity classification for the query (e.g., malicious, highly suspicious, unknown, unable to classify, etc.). One remediation activity can be to block the IP address of the requester (i.e., the computing device initiating or otherwise relaying the query/input for ingestions by the MLA 130). The IP address can also be used to filter (i.e., modify or otherwise redact) queries before they are input into the MLA 130. The remediation activities can also include generating alerts (e.g., sysadmin alerts) indicating suspicious/malicious queries. Further, the remediation activities can include capturing system/process behavior associated with suspicious/malicious queries for analytics or other tracking purposes.

Turning again to adversarial attack detection, given a machine learning model F which is available as a black box model to registered users $u\_i$ who submit samples $x\_i$ to the model in order to get an output $p\_i$. An adversarial attack will attempt to add an adversarial modification $a\_i$ such that $F(x\_i+a\_i) != F(x\_i)$. However, this typically requires multiple iterations (sometimes referred to as probes) in order to optimize $a\_i$ to be as small or human imperceptible as possible as these modifications will happen in a distributed manner, using different users $u\_i$ in order to mask the attack and not able to rely on the history of samples submitted by a single user. So for multiple users, the arrangement would be something such as:

- u_1 submits sample x (this is the original samples and u_1 might be a long time user (i.e., a user with an established account) without any history indicating malicious activity)
- u_2 submits sample x+a_2
- u_3 submits sample x+a_2+a_3
- u_4 submits sample x+a_2+a_3+a_4

Here, the addition (+) represents a small modification on the input. These modifications can be added one on top of the other as represented here, or they could be different but aiming in the same direction (thus making a sample adversarial).

The user information repository 198, 199 can include information about the users u_i, for example the age of the account, the history of samples that have been submitted by the user, utilized IP addresses and perhaps other identifiable information. All of this information can be stored in an embedded vector, giving a space in users can be compared.

Figure 12:
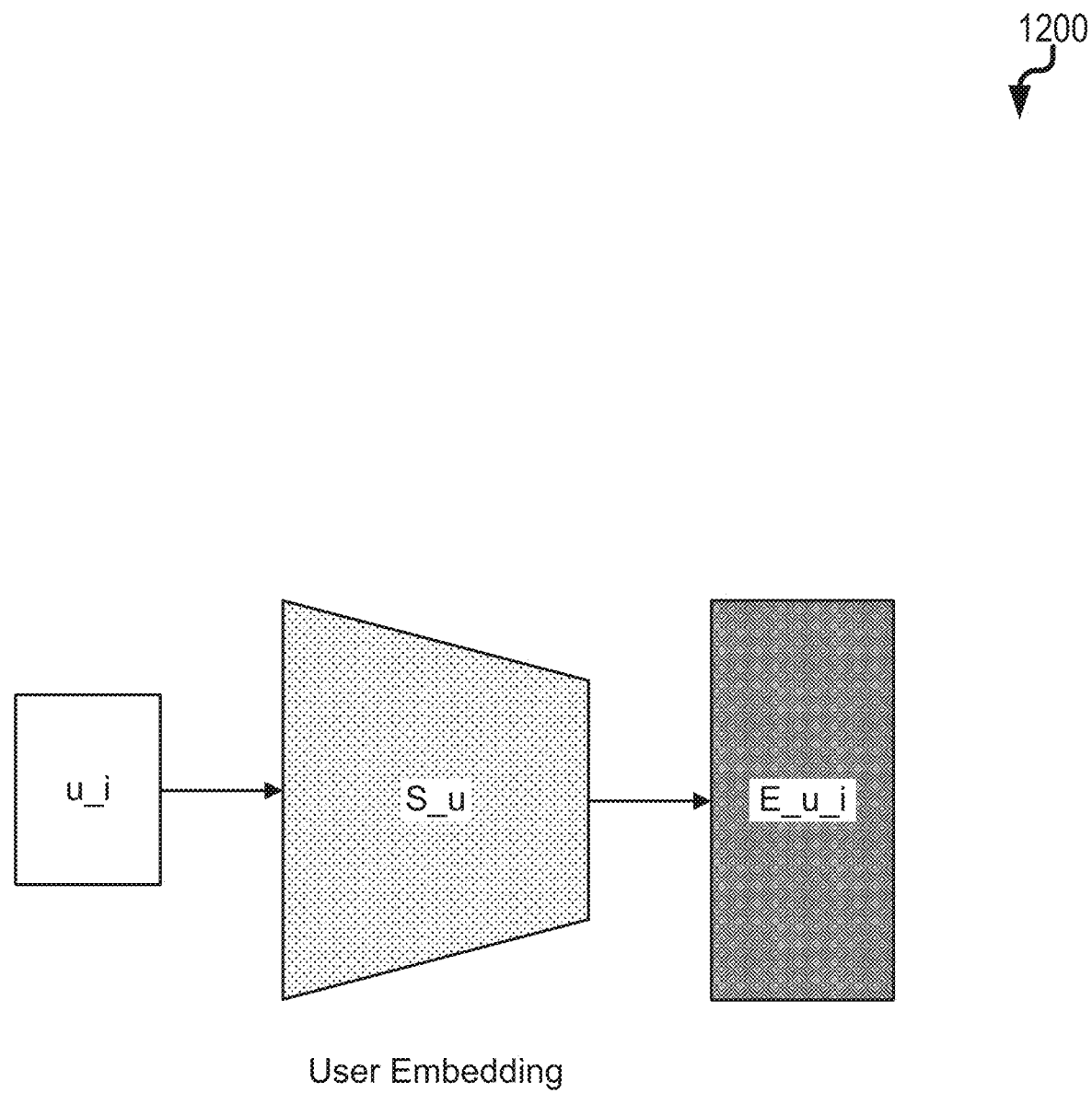
FIG. 12 is a diagram illustrating a user embedding.

With reference to diagram 1200 of FIG. 12, a vector characterizing information about user u_i can be input into a machine learning model S_u (e.g., a neural network, etc.) in order to generate an embedding E_u_I for the user (i.e., a user embedding).

Figure 13:
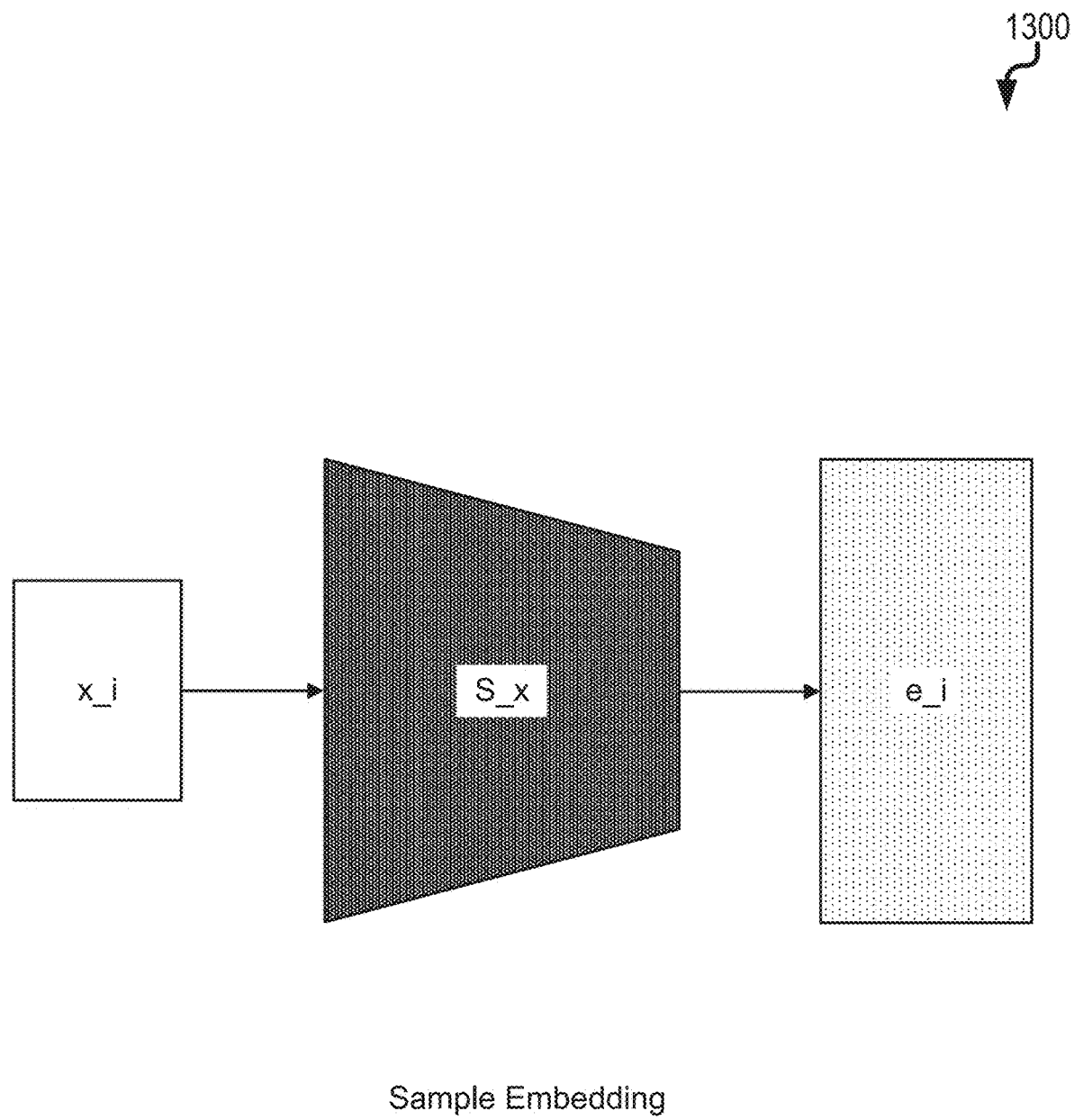
FIG. 13 is a diagram illustrating a sample embedding.

With reference to diagram 1300 of FIG. 13, an embedded space can be created from the samples x_i that have been submitted by all users using a machine learning model S_x. A sample x_i in this embedded space (i.e., sample embedding) can be denoted as e_i.

In some variations, a joint embedded space can be created to represent the vector [u_i, x_i], this space has the information of both the sample and the user in the same space. For this arrangement, the sample can be mapped to the embedded space using a model S_ux.

Note that all of these embedding spaces can be created by a defender by training an auto encoder. The autoencoder could be trained with stochastic gradient descent to reconstruct the data (x_i, u_i, [x_i, u_i]) and the embedded space would be the representation of the data at the bottleneck of the model. Other embedding spaces can be used from pre-trained models if the data is suitable, for example an embedding generated using an LLM.

Figure 14:
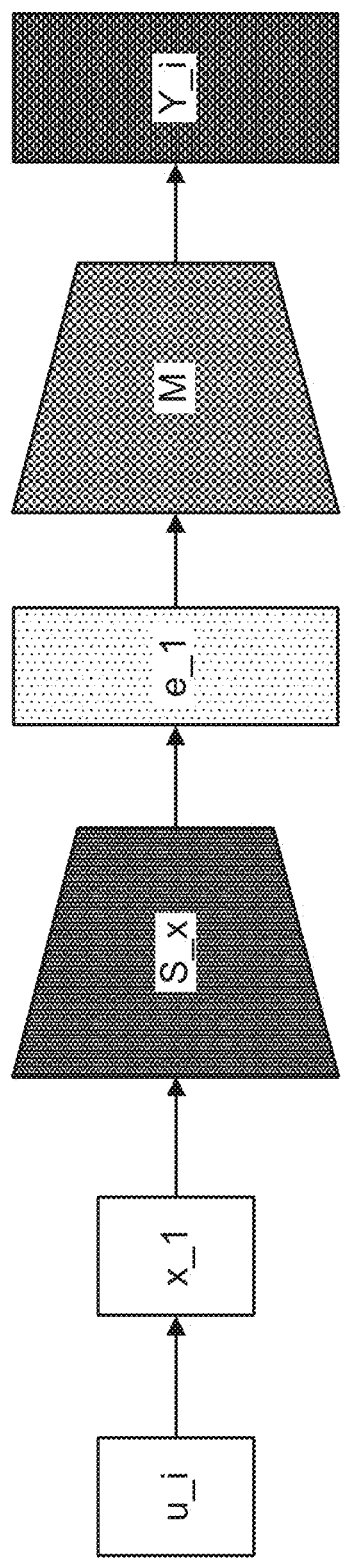
FIG. 14 is a diagram illustrating a model using an embedded space as input.
Figure 15:
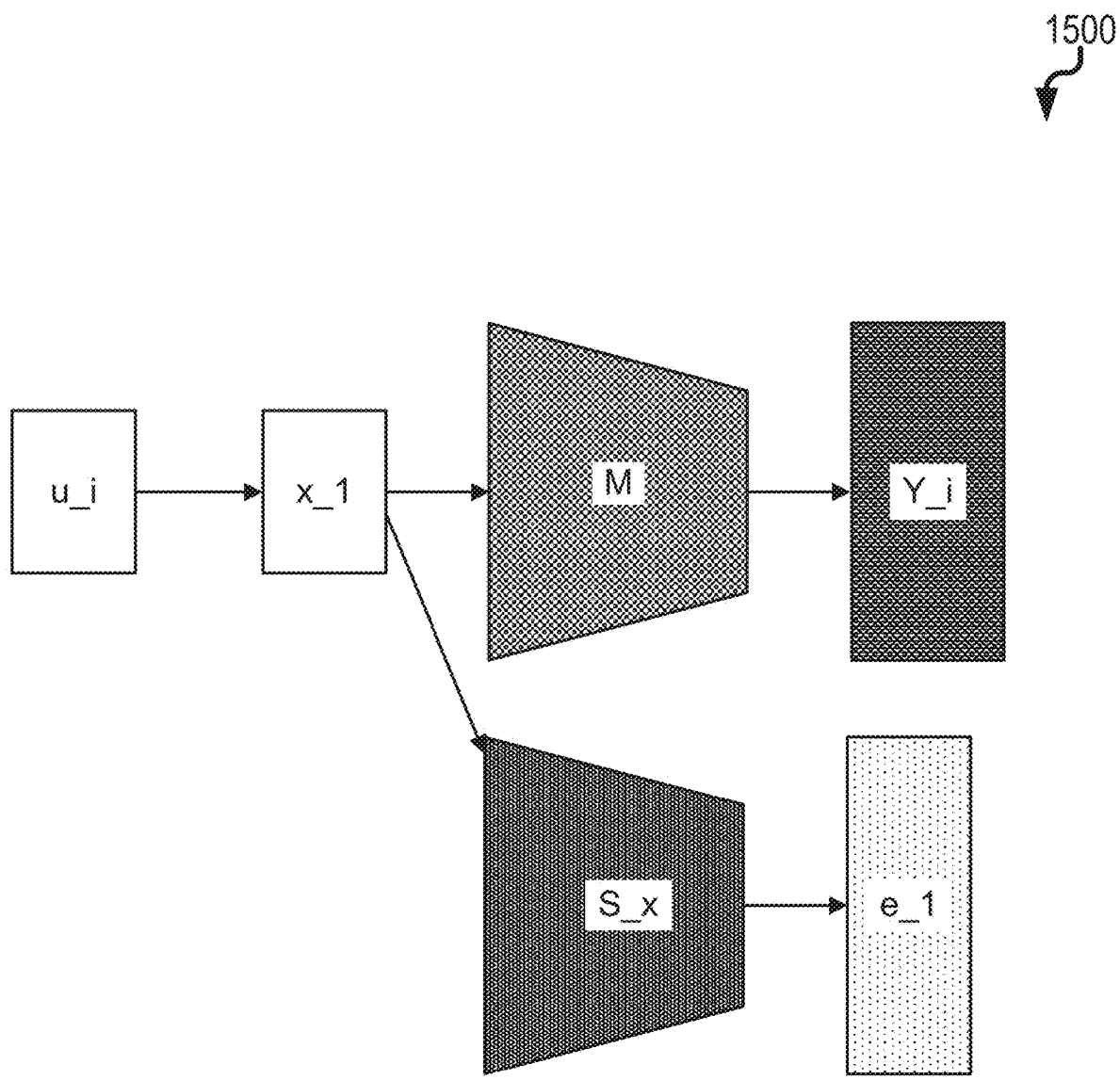
FIG. 15 is a diagram illustrating a model using an original space representation as input.

Note that the model M used to make a prediction can use the embedded space as in diagram 1400 of FIG. 14 or the original space as in diagram 1500 of FIG. 15.

Figure 16:
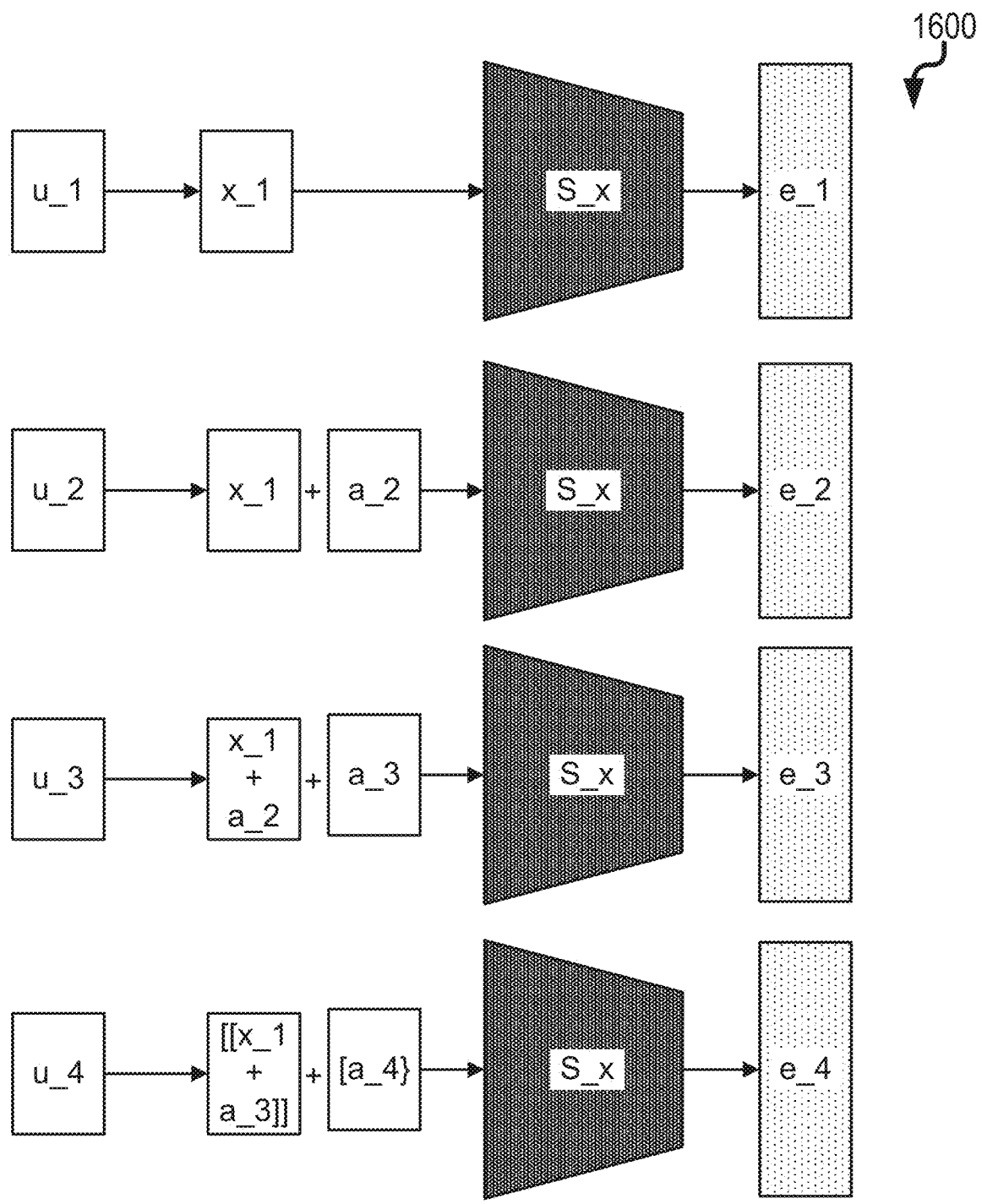
FIG. 16 is a diagram illustrating different users submitting iterative versions of an attack.

With reference to diagram 1600 of FIG. 16, below is an example of a distributed adversarial attack:

- u_1 submits sample x, it is embedded as e_1=S_x(x)
- u_2 submits sample x+a_2, it is embedded as e_2=S_x(x+a_2)
- u_3 submits sample x+a_2+a_3, it is embedded as e_3=S_x(x+a_2+a_3)
- u_4 submits sample x+a_2+a_3+a_4, it is embedded as e_4=S_x(x+a_2+a_3+a_4)

It is expected that e_1, e_2, e_3 and e_4 will be very close in the embedded space as they only differ based on a very small modification a_i.

Figure 17:
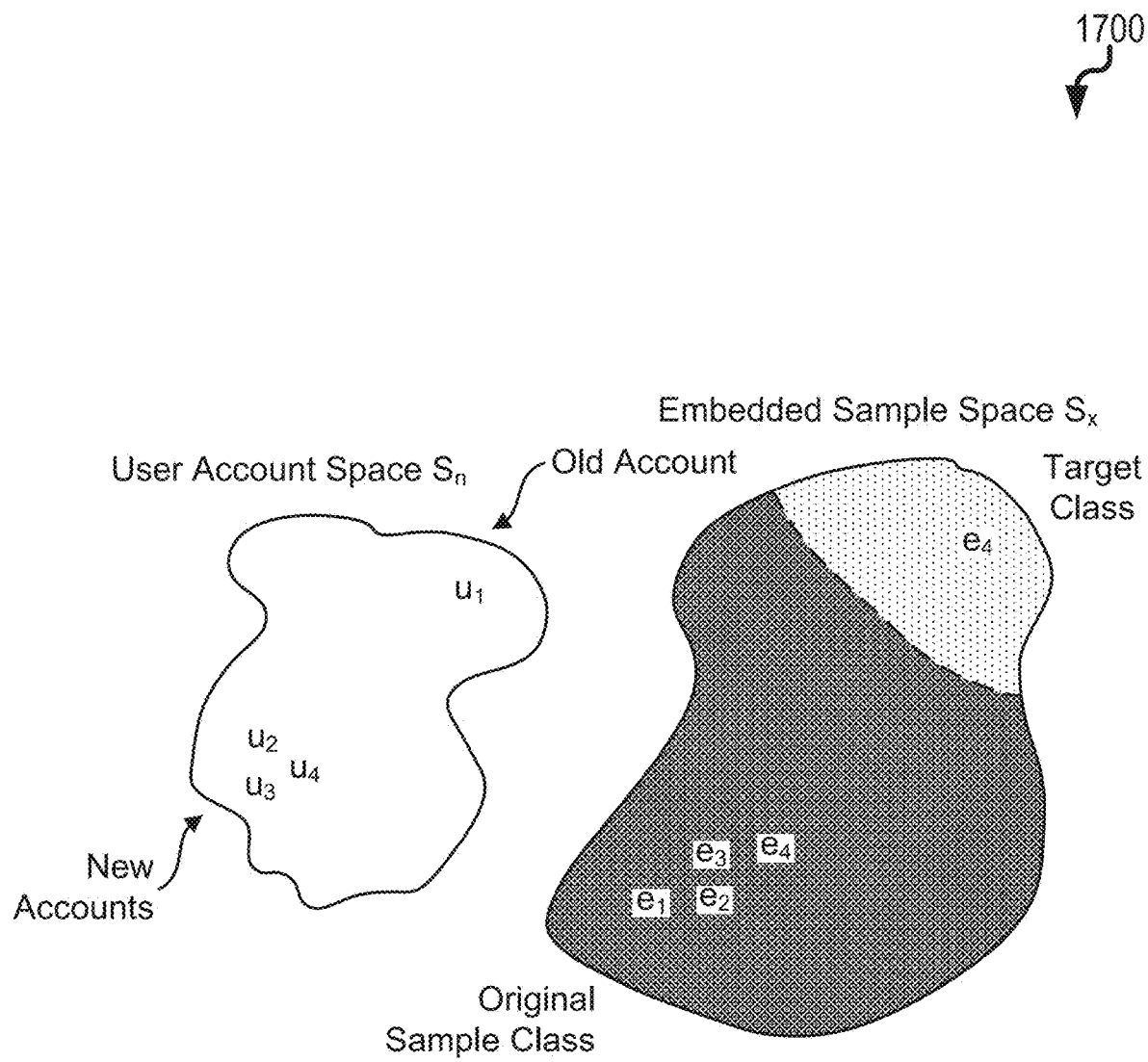
FIG. 17 is a diagram illustrating a user account space relative to an embedded sample space.

Additionally, with reference to diagram 1700 of FIG. 17, it is reasonable to expect u_2, u_3 and u_4 to be very similar, for example low account age because it is likely that these accounts were created only with the objective of making the attack.

Figure 18:
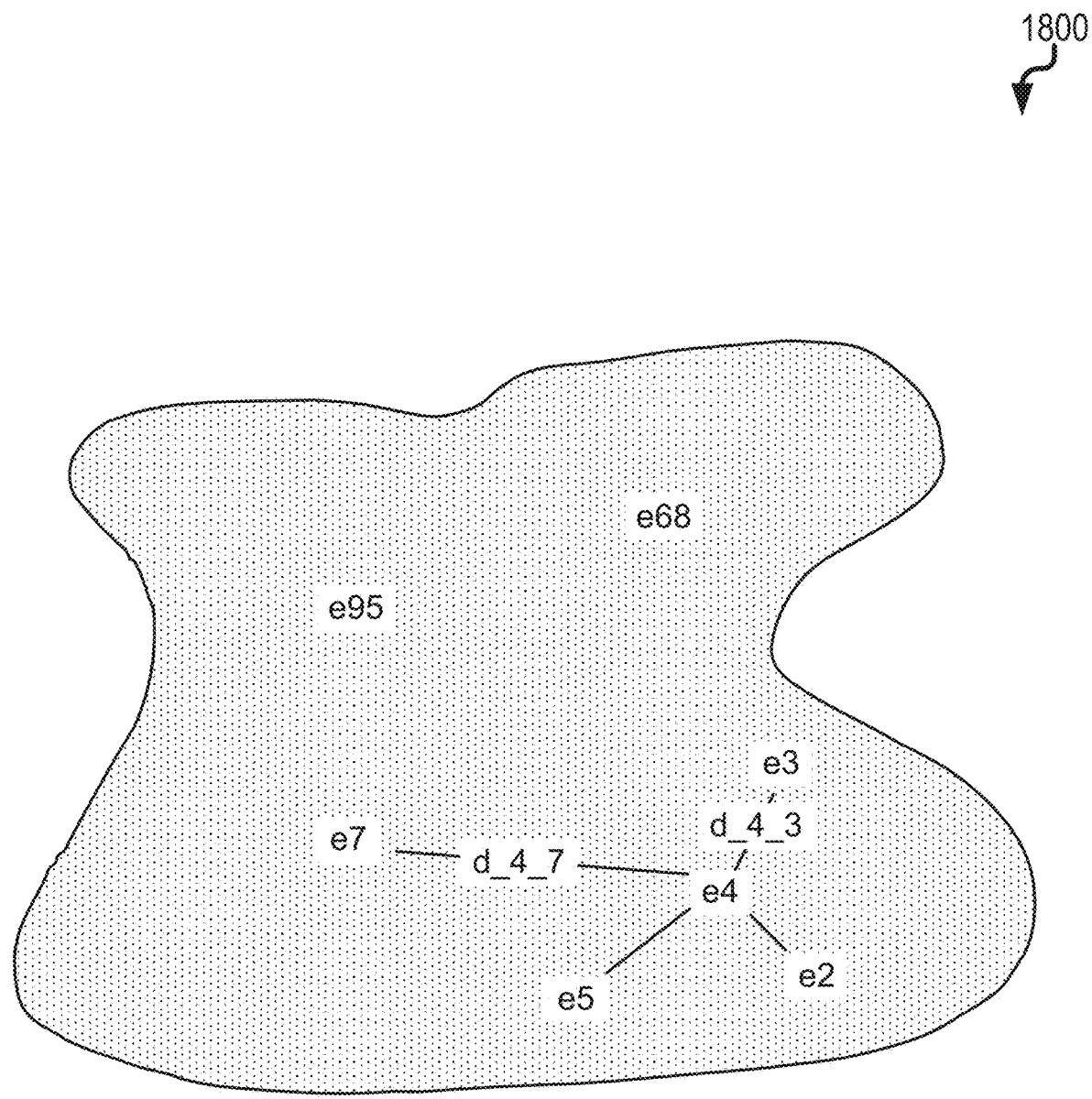
FIG. 18 is a diagram illustrating K nearest neighbors with corresponding distances relative to a single sample.

With reference to diagram 1800 of FIG. 18, assume that u_4 submits sample x+a_2+a_3+a_4. This sample will be embedded to obtain e_4=S_x(x+a_2+a_3+a_4).

Thereafter, a distance-based search, such as a K-nearest neighbor (KNN) search, can be conducted on the embedded space of samples submitted by all users. The nearest K samples in the embedded space can be returned along with their distances in the embedded space resulting in k distances [d(e_4, e_k)].

Figure 19:
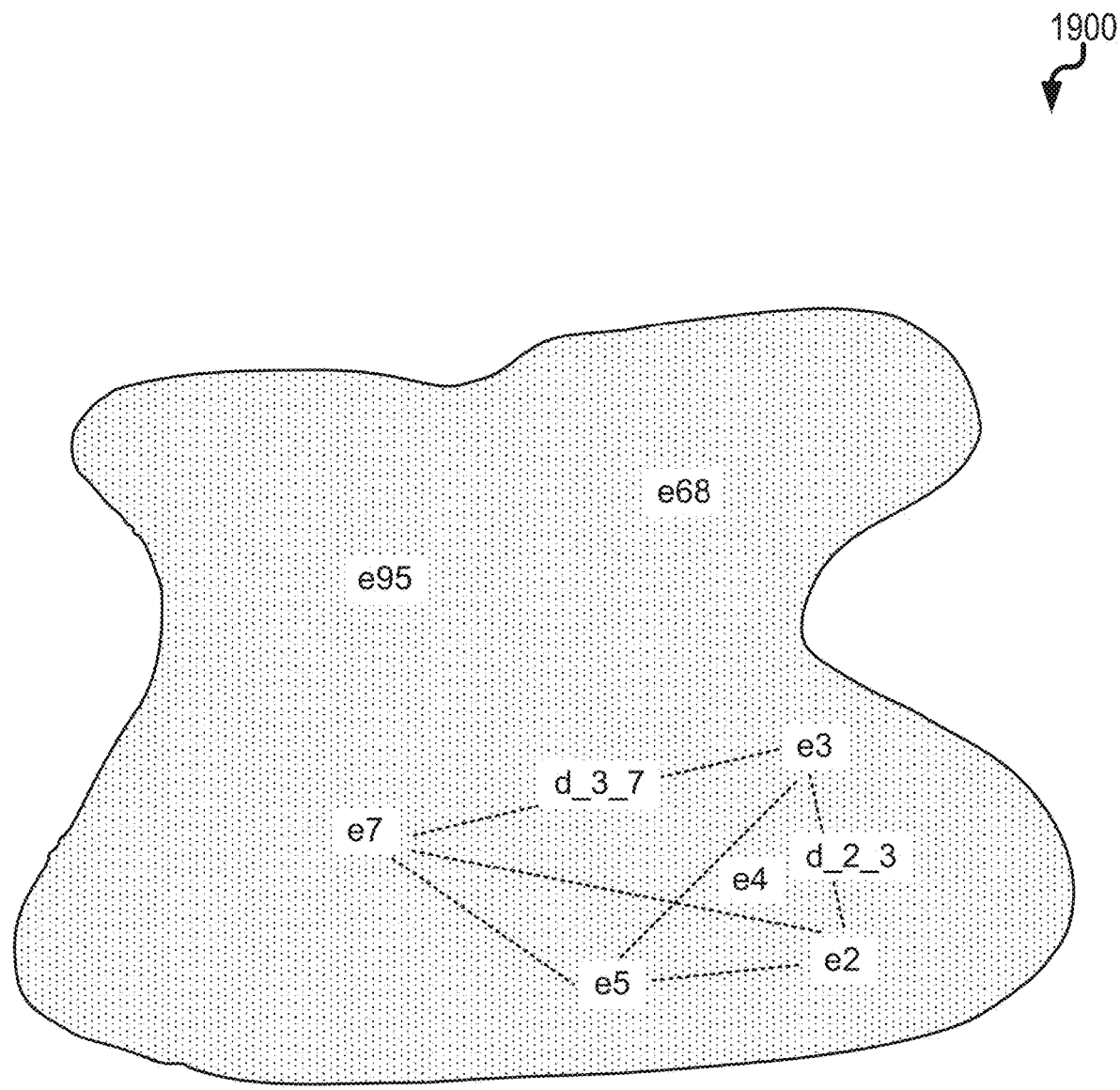
FIG. 19 is a diagram illustrating K nearest neighbors with respective corresponding distances.

Additionally, with reference to diagram 1900 of FIG. 19, the distances between the K samples d(e_i, e_k) can be obtained (where i!=k!=4) to assess how compact is the cluster. This compactness measurement can be used to discard outliers or normalize the distances. For example, if the median distance is 3 and a sample has a distance of 50, the sample with the distance of 50 can be discarded as an outlier. Other metrics such as, the standard deviation of the distances, can be used to characterize how compact is the cluster.

In some variations, samples with distance equal to zero can be excluded because such a value indicates that the sample is the same as a previously submitted sample by the same or another user.

The distance between the samples can be calculated in multiple ways including, for example one or more of a Euclidean distance, a Minkowski distance, a cosine distance, a Hamming Distance and/or a Levenshtein distance.

If the distances between the returned neighbors are small, this is a first signal that the MLA 130 (or peripheral systems/devices) might be under attack, but such information alone is often not sufficient. Rather, this scenario, on its own, indicates that there have been similar samples that have been submitted.

A small distance can be defined in multiple ways. Values for a small distance can be a user-defined parameter, such that every distance below a threshold is considered close. Value ranges for a small distance can be defined as a property of the space or region, for example by calculating the distances between each sample in the space and considering the smaller 10% of distances small in order to define a threshold. This can be done for a smaller region of interest, or a random sample of points in the space if we want to approximate the value. Small distance values can also be defined locally. For example, by taking the 100 nearest neighbors of the sample of interest and calculating the threshold using the previously defined method.

In some variations, the distance to the closest sample can be obtained and used to normalize all the distances (divide them by the smallest distance) so the smallest distance would be 1 and the rest would be rescaled. Then the threshold can be defined by the user as a multiple of the smallest distance Once there is a combination of neighbors that are a small distance or a large distance from the sample of interest, this information can be used to make a partial decision. This information can be captured, for example, if 50% of the samples are close.

In some variations, a soft-detection operation can be implemented at this point. This soft-detection operation can include checking the diversity of the returned neighbors. A majority of the neighbors having the same label can be indicative of a distributed adversarial attack.

For each one of the close embedded sampled or a selection of them, in this case, e_1, e_2, e_3, information characterizing the corresponding users u_1, u_2, u_3 that submitted those samples can be obtained.

Similarity analyses can then be conducted between the users u_1, u_2, u_3 with u_4 and with each other. It is very likely that the accounts used to perform a distributed attack are very similar since they are probably created using a similar semi-automated process.

Figure 20:
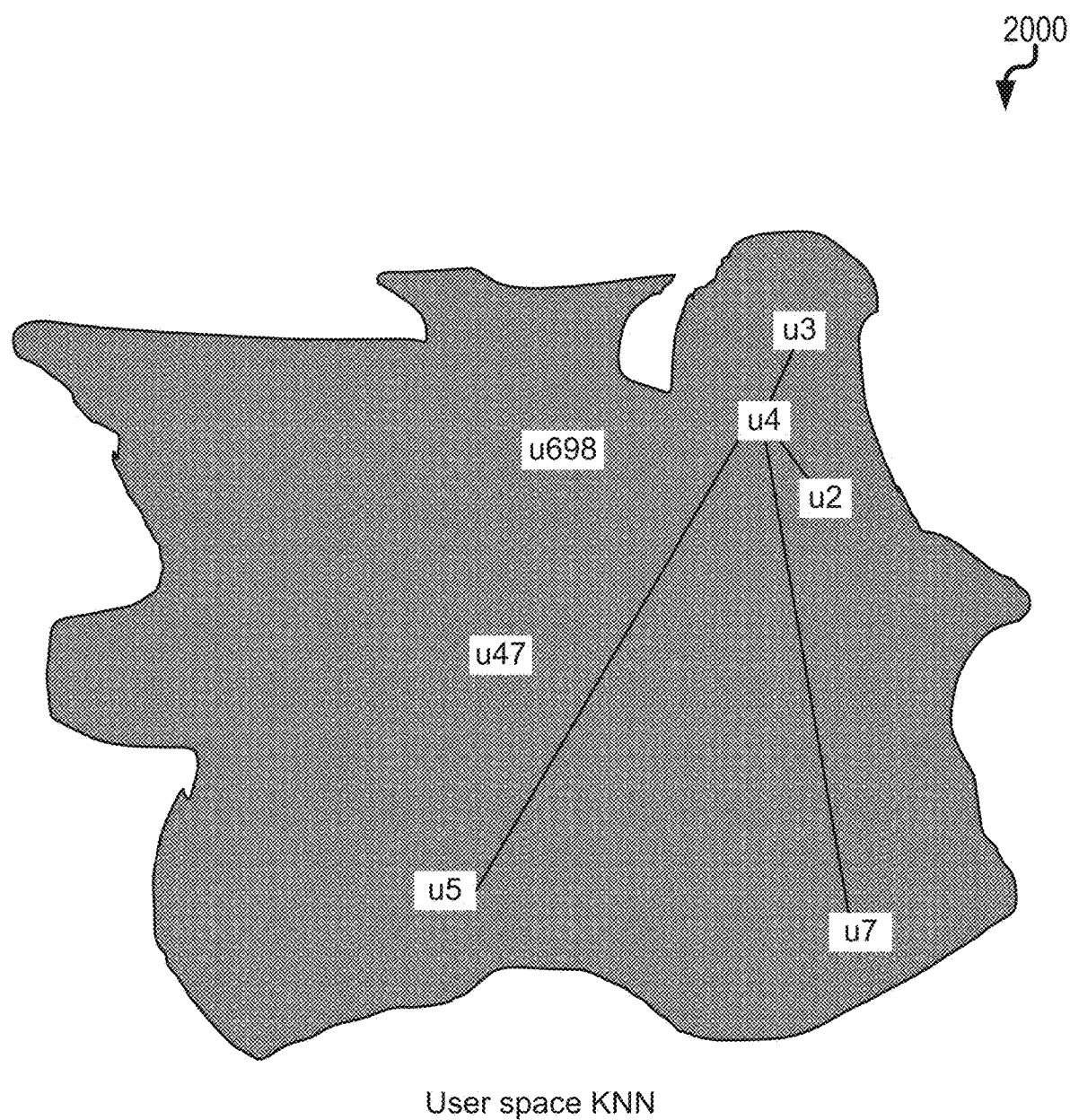
FIG. 20 is a diagram illustrating user space K nearest neighbors.

With reference to diagram 2000 of FIG. 20, the K distance [d(u_4, u_1), . . . d(u_4, u_k)] is obtained. Notice that this K does NOT have to be the same K that was used for e_i samples. Additionally, one can get the distances between the K samples d(u_i, u_k) to assess how compact is the cluster just like the assessment for the e_i samples.

Here, one can also consider if a sample has been submitted by multiple users. For example, if a sample e_2 has been submitted by 100 users with a long history of benign samples, it is likely this is not something to worry about. However, information may be needed to be captured if sample e_2 has only been submitted by 2 users, both of which are very new.

Outliers can be removed using any varying selection of neighbors or distances similar to the approaches described above with regard to e_i.

Calculate which of these users are close can be performed using the same or similar techniques as described above for e_i.

At this point, one can also make a partial decision based on if the users are very similar or not.

The user selection can be combined based on known information. For example, more importance can be given to users that have been identified as new users compared to long standing active users. This importance can be applied using a weight on the distance. Other attributes can also be used to weight distances.

The distances between the embedded space samples e_i and the distances between the accounts u_i can be combined. If it is determined that similar users are submitting a very similar, but not exact sample, a determination can be made by the analysis engine 152, 170 that there is a strong likelihood of a distributed adversarial attack so that one or more remediation actions can be initiated (for example, by remediation engine 154, 180 and/or external remediation resources 190, etc.).

In some cases, and which reference to diagram 2000 of FIG. 20, the analysis engine 152, 170 executes a query injection analyzer 192, 194 which, in turn, executes one or more machine learning-based detection models 2010 (e.g., neural networks, etc.) trained using the distances and other information such as which embedding corresponds to which user, time between probes, etc. In some variation, all the information about the K samples, sample distances, users, user distances and labels along with any other metadata like timestamps or user information available, can be concatenated and then fed into the query injection analyzer 192, 194.

Figure 21:
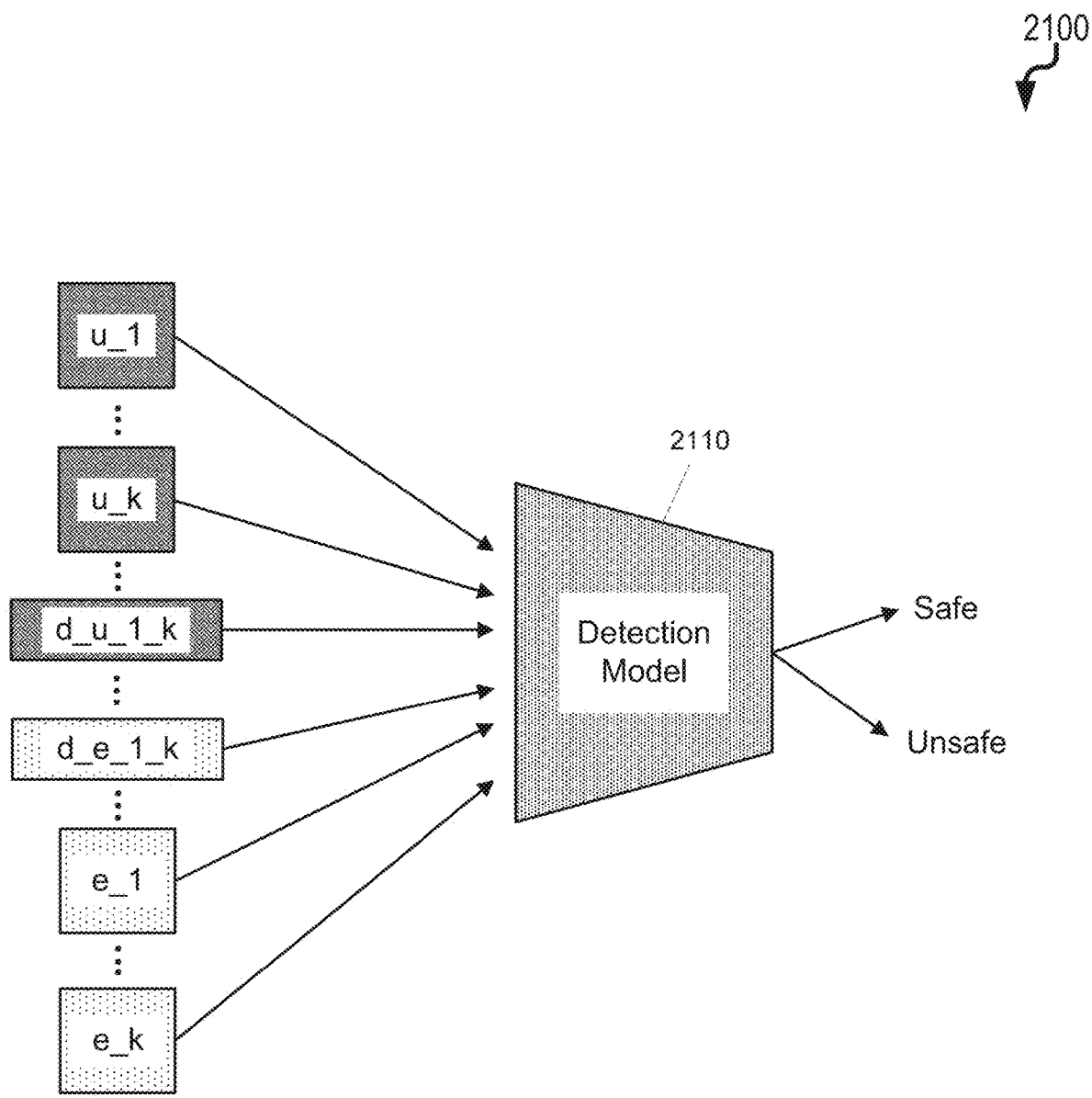
FIG. 21 is a diagram illustrating a first detection model architecture for characterizing a likelihood of a distributed adversarial attack.

With reference to FIG. 21, another arrangement can be to separate information, for example by passing the information about the users and how close were the sample to a user detection model 2020 (which can be machine learning-based) and about the samples and labels to a sample detection model 2030, then combine the outputs for ingestion into the detection model 2010.

With such an arrangement, both of the user detection model 2020 and the sample detection model 2030 indicating an adversarial attack can raise the highest level of alert (which in turn can cause more effective or computationally intensive remediation actions to be initiated). In other variations, if only one of the user detection model 2020 and the sample detection model 2030 generates an output indicative of an adversarial attack, a medium alert or corresponding remediation action can be initiated.

Figure 22:
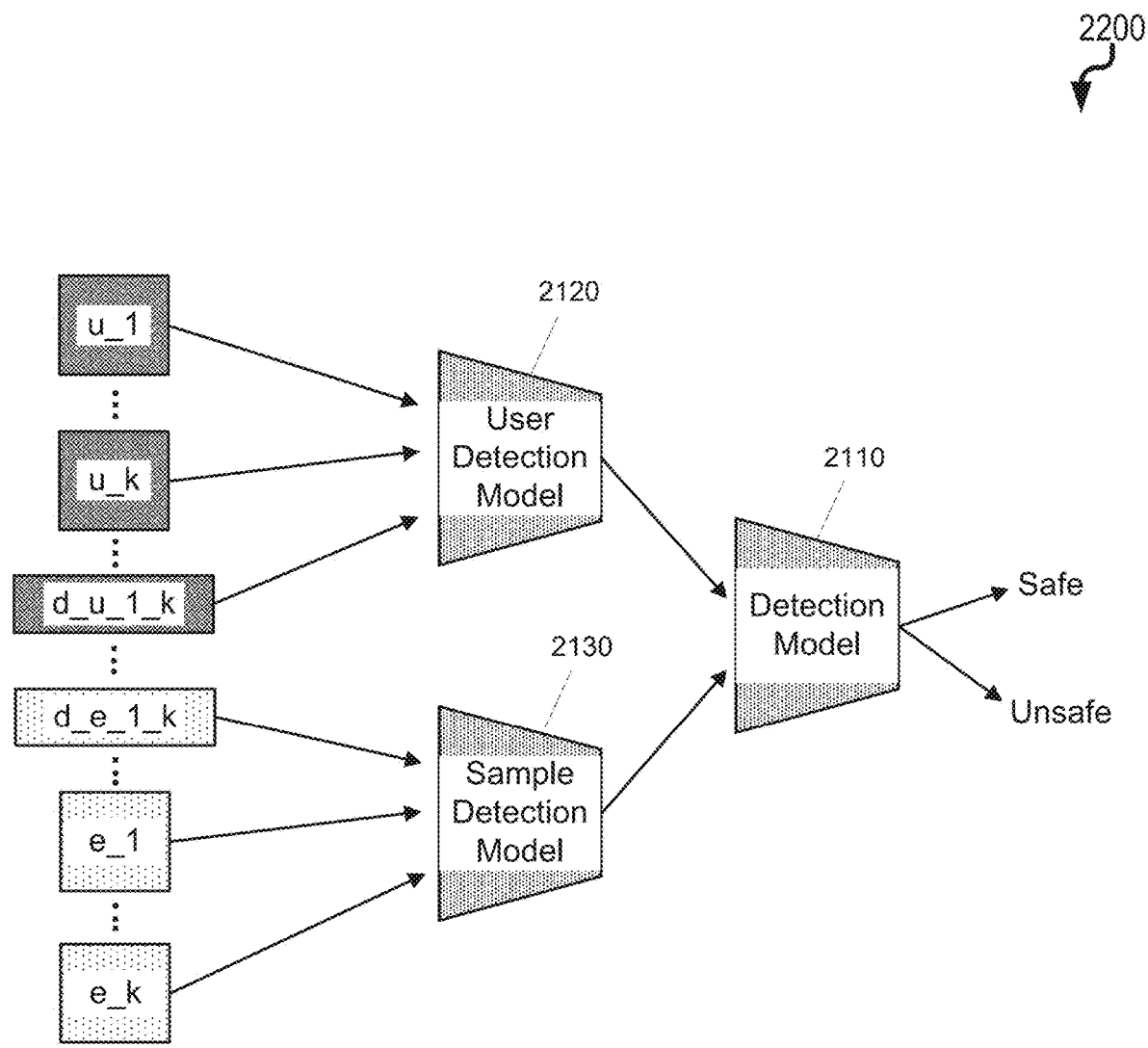
FIG. 22 is a diagram illustrating a second detection model architecture for characterizing a likelihood of a distributed adversarial attack.
Figure 23:
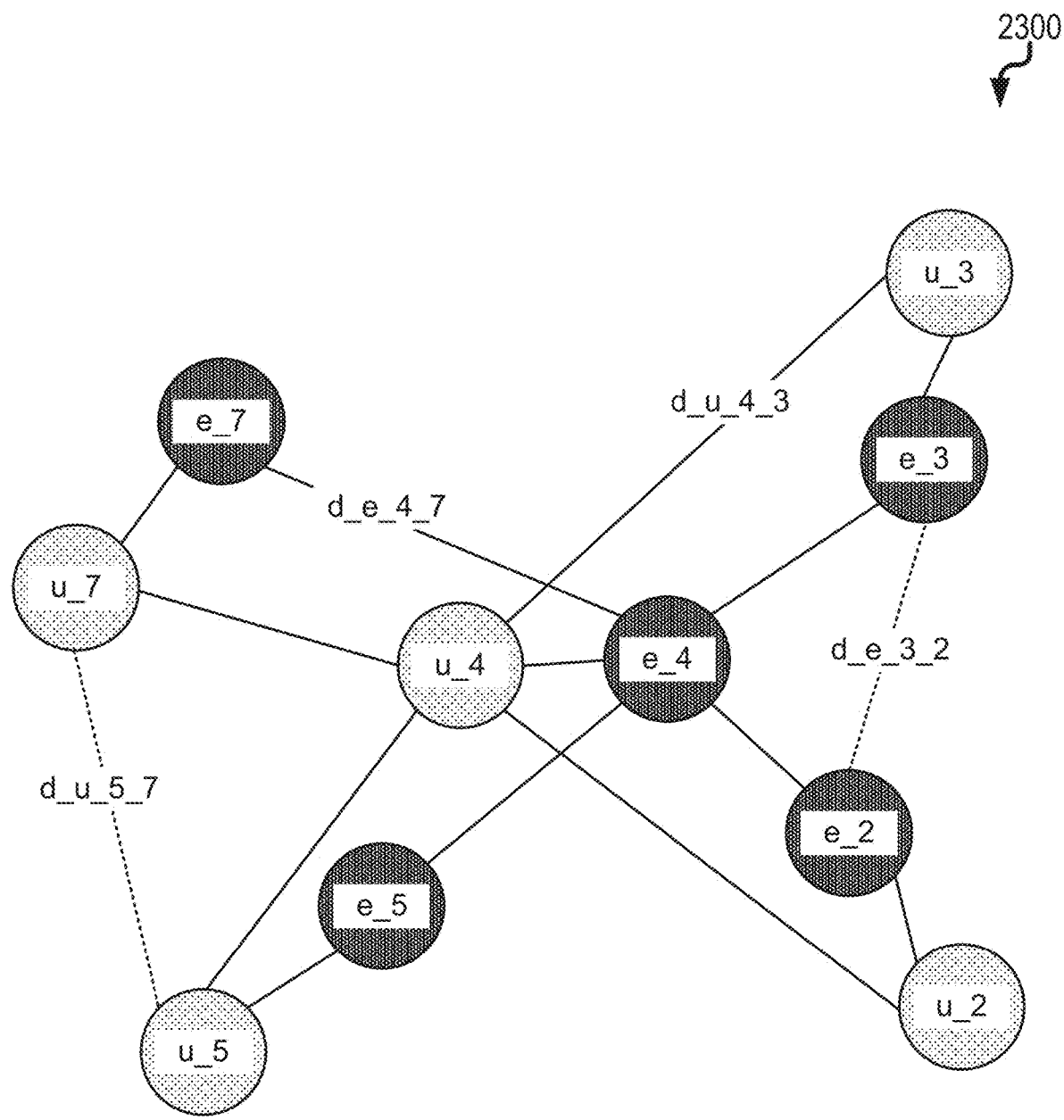
FIG. 23 is a diagram illustrating an example simplified graph representation.

Another way would be to represent this information is as a graph as provided in diagram 2200 of FIG. 22. A graph neural network can be trained to make the prediction by creating an embedded space representation of each sample and the relation with its neighbors and passing these samples to another model to make the final prediction.

In one variation, the creation of the embedded space can be done by using a hashing transformation to create a mapping from the input space into the hashing space. This hashed space can sometimes provide its own way to measure distance between hashed samples. This is the distance, for example, can be used for KNN.

In other variations, watermarks introduced by generative models can be scanned and used as a feature for the detection model 2010. This watermark can be used, for example, to detect likely fake users as they are likely to be submitting mostly artificially generated content as benign content. Similar measures can be employed with known public data.

Figure 24:
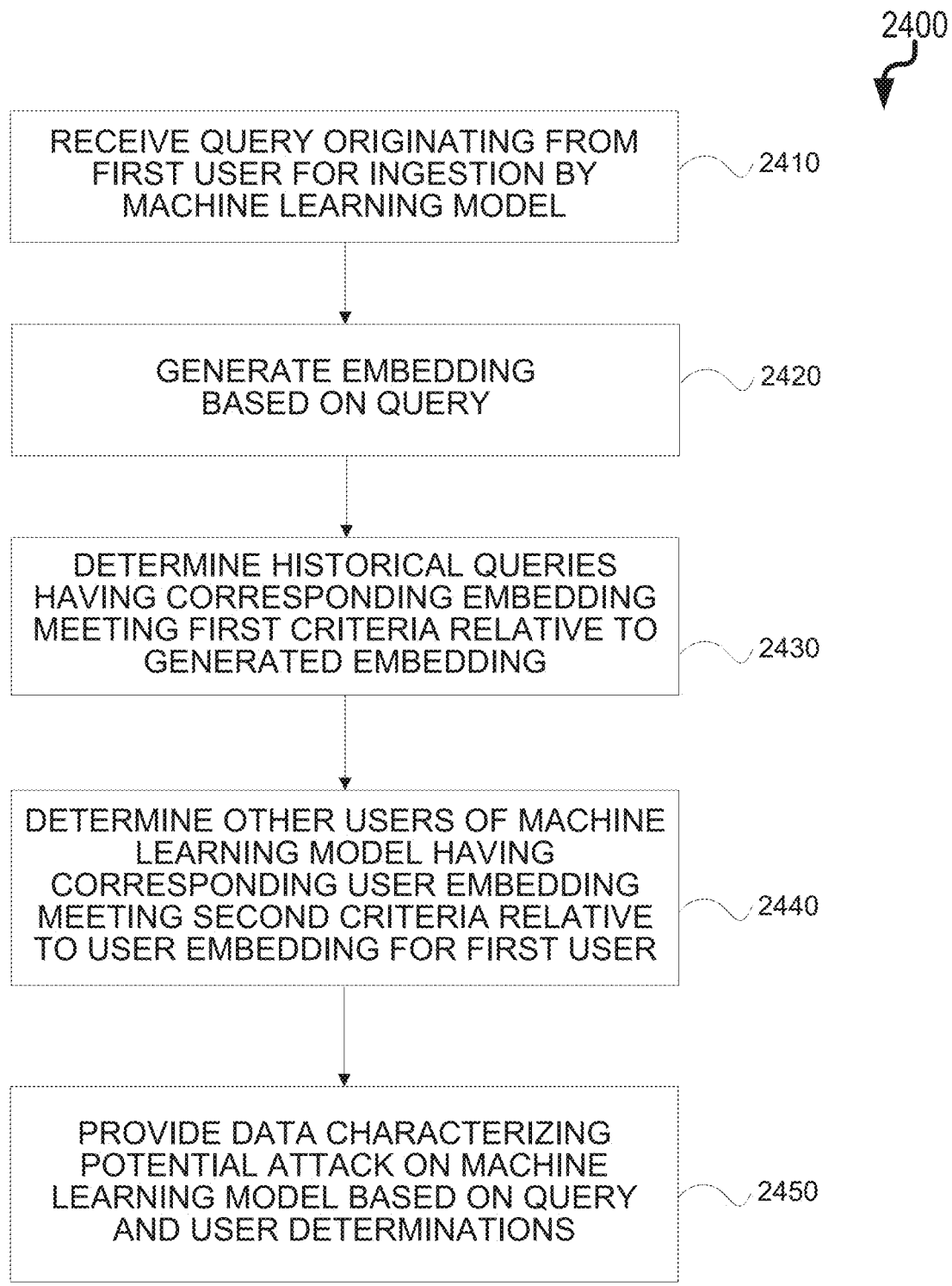
FIG. 24 is a first process flow diagram illustrating a technique for identifying an adversarial attack on a machine learning model.

FIG. 24 is a diagram 2400, in which at 2410, a query to be input into a machine learning model which is associated with a first user is received. Thereafter, at 2420, a first embedding is generated based on the query. A plurality of historical queries of the machine learning model having a corresponding embedding meeting first criteria (e.g., distance, within n nearest neighbors, within a centroid, etc.) relative to the first embedding is then determined, at 2430, using a first distance-based similarity analysis technique. In addition, at 2440, a plurality of other users of the machine learning model each having a corresponding user embedding meeting second criteria (e.g., distance, within k nearest neighbors, within a centroid, etc.) relative to a user embedding for the first user are determined using a second distance-based similarity analysis technique. Data indicating a potential attack on the machine learning model is provided, at 2450, to a consuming application or process based on the query neighbor determination and the user neighbor determination.

Figure 25:
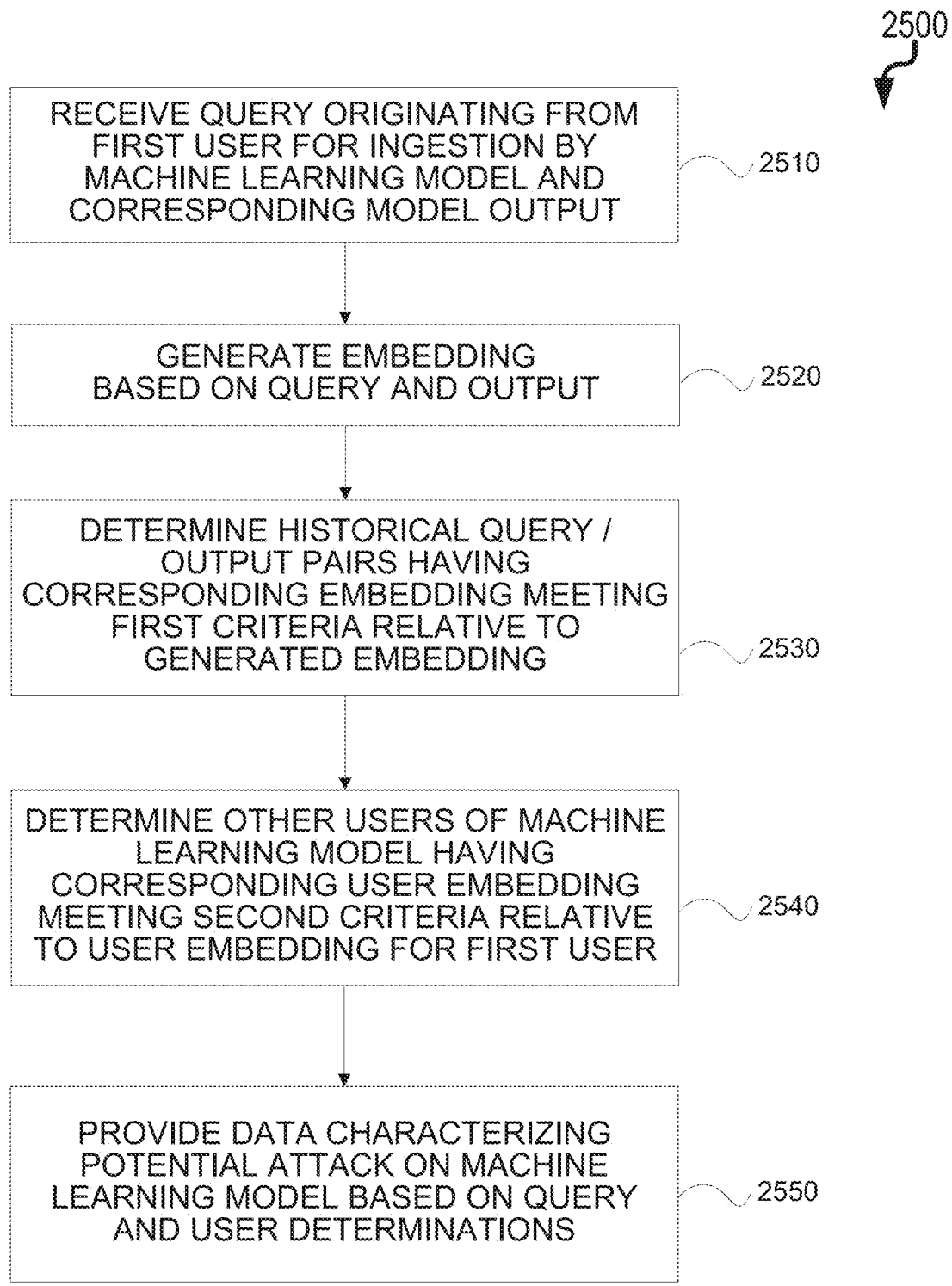
FIG. 25 is a second process flow diagram illustrating a technique for identifying an adversarial attack.

FIG. 25 is a diagram 2500 in which, at 2510, a first query associated with a first user to be input into a machine learning model and a first output generated by the machine learning model responsive to the first query is received. A first embedding is generated, at 2520, based on the combination of the first query and the first output. It is then determined, at 2530, using a first distance-based similarity analysis technique, a plurality of historical pairs of queries and outputs of the machine learning model having a corresponding embedding meeting first criteria (e.g., distance, within n nearest neighbors, within a centroid, etc.) relative to the first embedding. It is also determined, at 2540, using a second distance-based similarity analysis technique, a plurality of other users of the machine learning model each having a corresponding user embedding meeting second criteria (e.g., distance, within k nearest neighbors, within a centroid, etc.) relative to a user embedding for the first user. Data indicating a likelihood of an attack on the machine learning model is provided, at 2550, to a consuming application or process based on the first determining and the second determining.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for identifying a distributed adversarial attack on a monitored machine learning model architecture comprising:
    receiving a first query associated with a first user to be input into a machine learning model;
    generating a first embedding based on the first query;
    first determining, using a first distance-based similarity analysis technique, a plurality of historical queries of the machine learning model having a corresponding embedding meeting first criteria relative to the first embedding;
    generating a user embedding for the first user based on a combination of historical queries associated with the first user and identifiable information for the first user;
    second determining, using a second distance-based similarity analysis technique, a plurality of other users of the machine learning model each having a corresponding user embedding meeting second criteria relative to the user embedding for the first user; and
    providing data indicating a potential attack on the machine learning model to a consuming application or process based on the first determining and the second determining.

2. The method of claim 1, wherein the first distance-based similarity analysis technique is same as the second distance-based similarity analysis technique.

3. The method of claim 1, wherein the first distance-based similarity analysis technique is different from second distance-based similarity analysis technique.

4. The method of claim 1, wherein the first criteria is a first distance threshold and the second criteria is a second, different distance threshold.

5. The method of claim 1, wherein the first criteria is a first distance threshold and the second criteria is a second, same distance threshold.

6. The method of claim 1, wherein a first portion of the historical queries originated from the first user and a second portion of the historical queries originated from users different from the first user.

7. The method of claim 6, wherein the first portion of the historical queries are weighted differently than the second portion of the historical queries.

8. The method of claim 1, wherein at least one of the first distance-based similarity analysis and the second distance-based similarity analysis comprises a k-nearest neighbor analysis.

9. The method of claim 1, wherein at least one of the first distance-based similarity analysis and the second distance-based similarity analysis calculates a Euclidean distance.

10. The method of claim 1, wherein at least one of the first distance-based similarity analysis and the second distance-based similarity analysis calculates a Minkowski distance.

11. The method of claim 1, wherein at least one of the first distance-based similarity analysis and the second distance-based similarity analysis calculates a cosine distance.

12. The method of claim 1, wherein at least one of the first distance-based similarity analysis and the second distance-based similarity analysis calculates a Hamming distance.

13. The method of claim 1, wherein at least one of the first distance-based similarity analysis and the second distance-based similarity analysis calculates a Levenshtein distance.

14. The method of claim 1, wherein at least one of the first distance-based similarity analysis and the second distance-based similarity analysis calculates two or more of: k-nearest neighbors, a Euclidean distance, a Minkowski distance, a cosine distance, a Hamming Distance and/or a Levenshtein distance.

15. The method of claim 1, wherein the second determining further comprises:
obtaining an output of the machine learning model responsive to the first query;
calculating a mean distance of the output to the known outputs corresponding to the historical queries; and
comparing the mean distance to the second distance threshold.

16. The method of claim 1, wherein at least some of the historical queries are derived from a cluster of neighboring historical queries.

17. The method of claim 1, wherein at least one of the first distance-based similarity analysis and the second distance-based similarity analysis considers distances between neighbors within the plurality of historical queries.

18. The method of claim 1 further comprising:
receiving an output of the machine learning model responsive to the first query;
generating a second embedding based on the output;
third determining, using a third distance-based similarity analysis technique, a plurality of other outputs of the machine learning model each having a corresponding output embedding meeting third criteria relative to the second embedding;
wherein the data provided indicating a potential attack on the machine learning model to a consuming application or process is further based on the third determining.

19. The method of claim 1, wherein the identifiable information for the first user comprises an Internet Protocol (IP) address for the first user.

20. The method of claim 1, wherein the identifiable information for the first user comprises account information used by the first user.

21. The method of claim 1, wherein the consuming application or process initiates one or more remediation actions to prevent or lessen an impact of the adversarial attack.

22. A computer-implemented method for identifying a distributed adversarial attack on a monitored machine learning model architecture comprising:
receiving a first query associated with a first user to be input into a machine learning model and a first output generated by the machine learning model responsive to the first query;
generating a first embedding based on a combination of the first query and the first output;
first determining, using a first distance-based similarity analysis technique, a plurality of historical pairs of queries and outputs of the machine learning model having a corresponding embedding meeting first criteria relative to the first embedding;
generating a user embedding for the first user based on a combination of historical queries associated with the first user and identifiable information for the first user;
second determining, using a second distance-based similarity analysis technique, a plurality of other users of the machine learning model each having a corresponding user embedding meeting second criteria relative to the user embedding for the first user; and
providing data indicating a potential attack on the machine learning model to a consuming application or process based on the first determining and the second determining.

23. A computer-implemented method for identifying a distributed adversarial attack on a monitored machine learning model architecture comprising:
receiving a first query associated with a first user to be input into a machine learning model;
generating a first embedding based on the first query;
determining, using a k-nearest neighbor analysis with a specified distance metric, a plurality of historical queries of the machine learning model having a corresponding embedding within a predefined distance threshold of the first embedding;
generating a user embedding for the first user based on a combination of historical queries associated with the first user and identifiable information for the first user, the identifiable information comprising age of account and Internet Protocol (IP) address;
determining, using a k-nearest neighbor analysis with a specified distance metric, a plurality of other users of the machine learning model each having a corresponding user embedding within a predefined user distance threshold of the user embedding for the first user;
providing data indicating a potential distributed adversarial attack on the machine learning model to a consuming application or process based on the determination that a majority of the nearest historical queries and user embeddings meet the respective distance thresholds; and
initiating a remediation action to prevent or lessen an impact of the potential attack.

24. The method of claim 23, wherein determining the plurality of historical queries comprises excluding historical queries having an embedding at zero distance to the first embedding.

25. The method of claim 23, wherein generating the user embedding for the first user further comprises incorporating a history of Internet Protocol (IP) addresses used by the first user over a predefined time period.

26. The method of claim 23, wherein the predefined distance threshold for the historical queries is defined as a distance less than a user-defined multiple of the smallest non-zero distance between the first embedding and the plurality of historical query embeddings.

27. The method of claim 23, wherein determining the plurality of other users further comprises weighting user embeddings by account age such that user embeddings associated with accounts below a predefined age threshold are given increased weight in the determination.

28. The method of claim 23, wherein providing data indicating a potential distributed adversarial attack further comprises generating a likelihood score of a distributed adversarial attack based on both the compactness of the historical query embeddings and the similarity of the user embeddings.

29. The method of claim 23, wherein the remediation action comprises modifying the first query prior to ingestion by the machine learning model to remove or alter content identified as potentially malicious.

30. The method of claim 23, wherein the remediation action is performed only when both (i) a cluster of historical query embeddings within the predefined distance threshold is associated with a plurality of user embeddings that are within the predefined user distance threshold of the user embedding for the first user, and (ii) at least a majority of those user embeddings correspond to accounts created within a predefined recent time period.

* * * * *